May 13, 1952     L. C. KAHLE     2,596,899
MACHINE FOR MAKING GLASS ARTICLES
Filed May 29, 1948     12 Sheets-Sheet 2

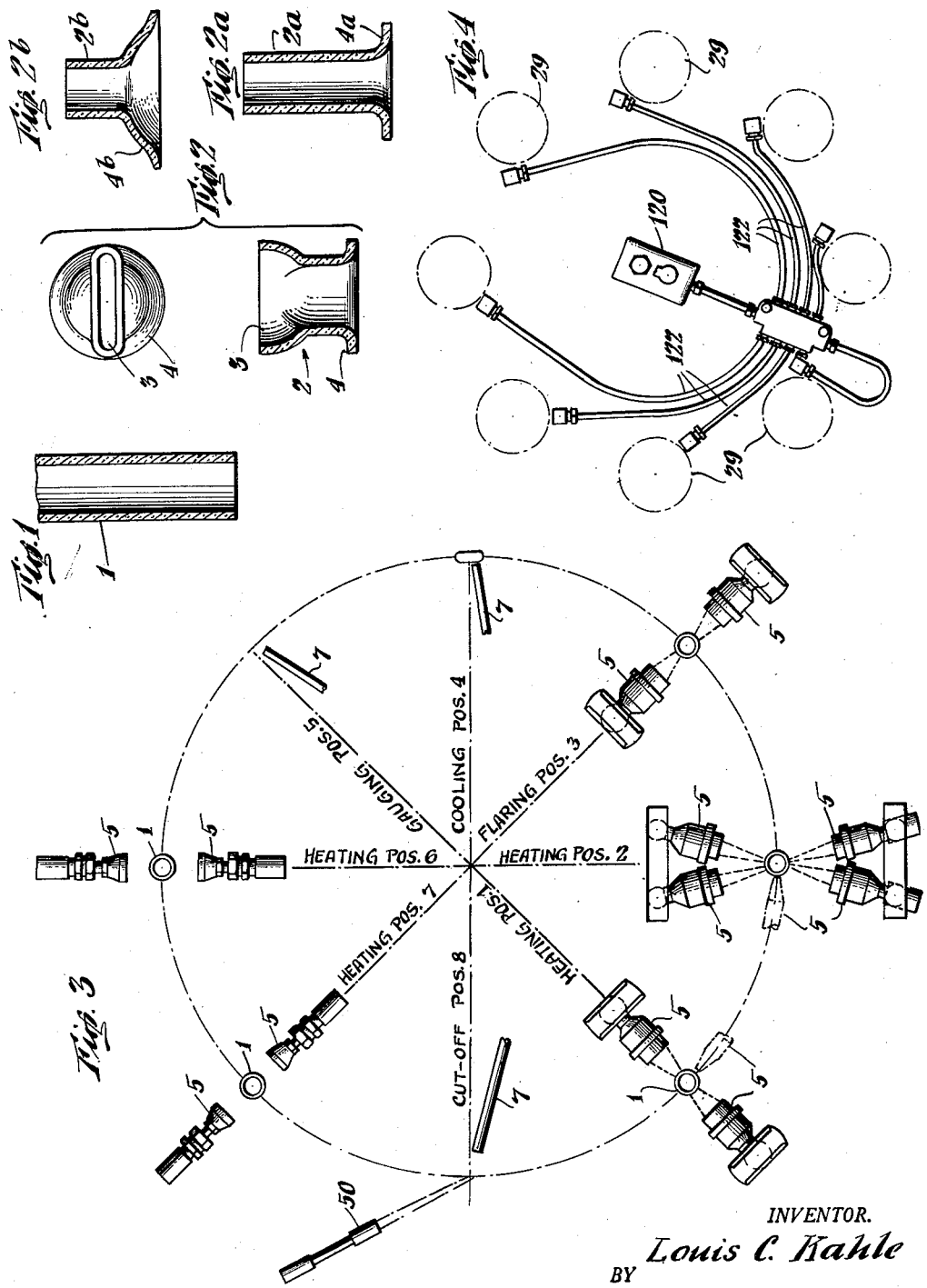

INVENTOR.
*Louis C. Kahle*
BY
*Norman W. Holland*
ATTORNEY

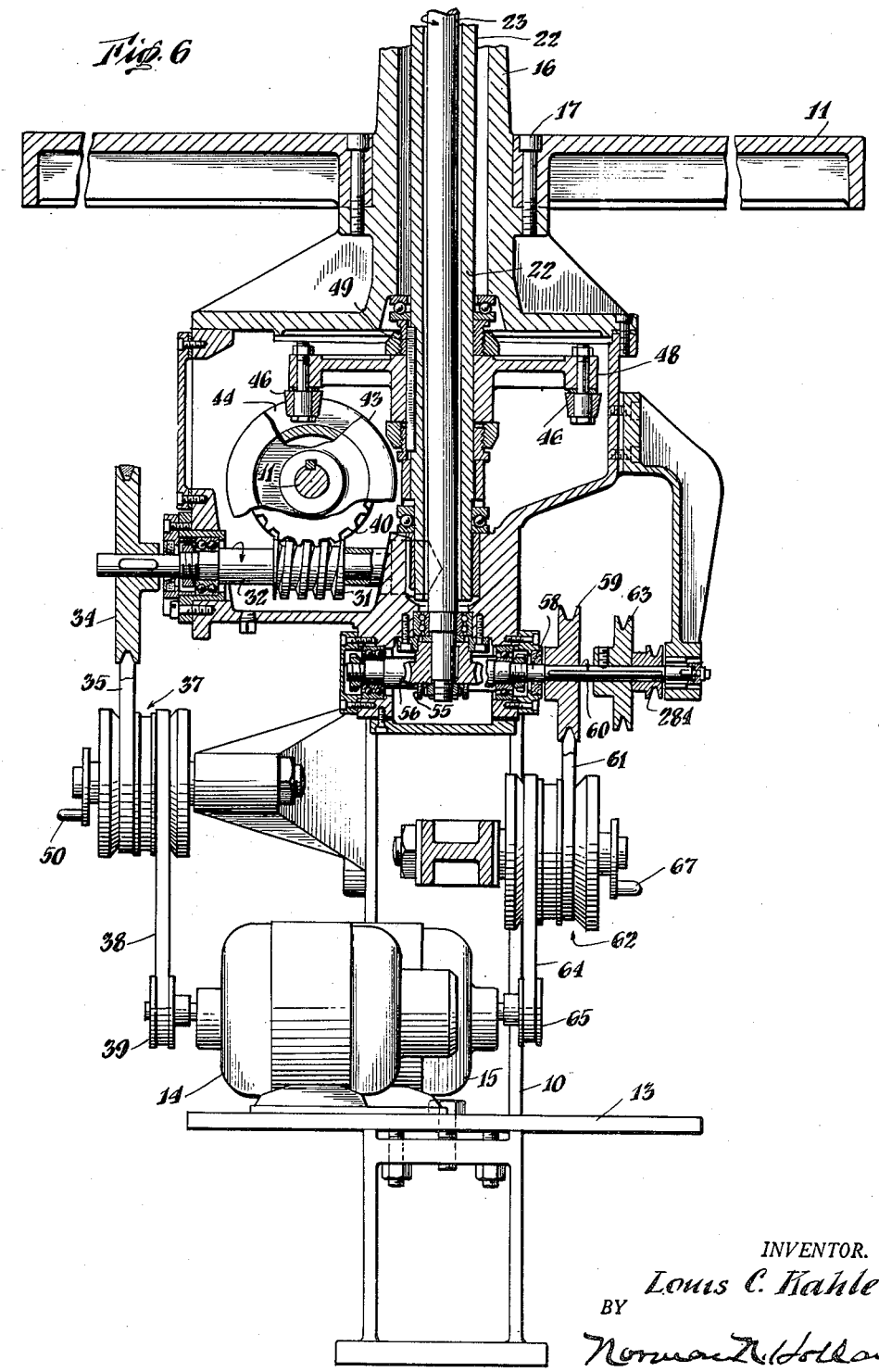

May 13, 1952 L. C. KAHLE 2,596,899
MACHINE FOR MAKING GLASS ARTICLES
Filed May 29, 1948 12 Sheets-Sheet 4
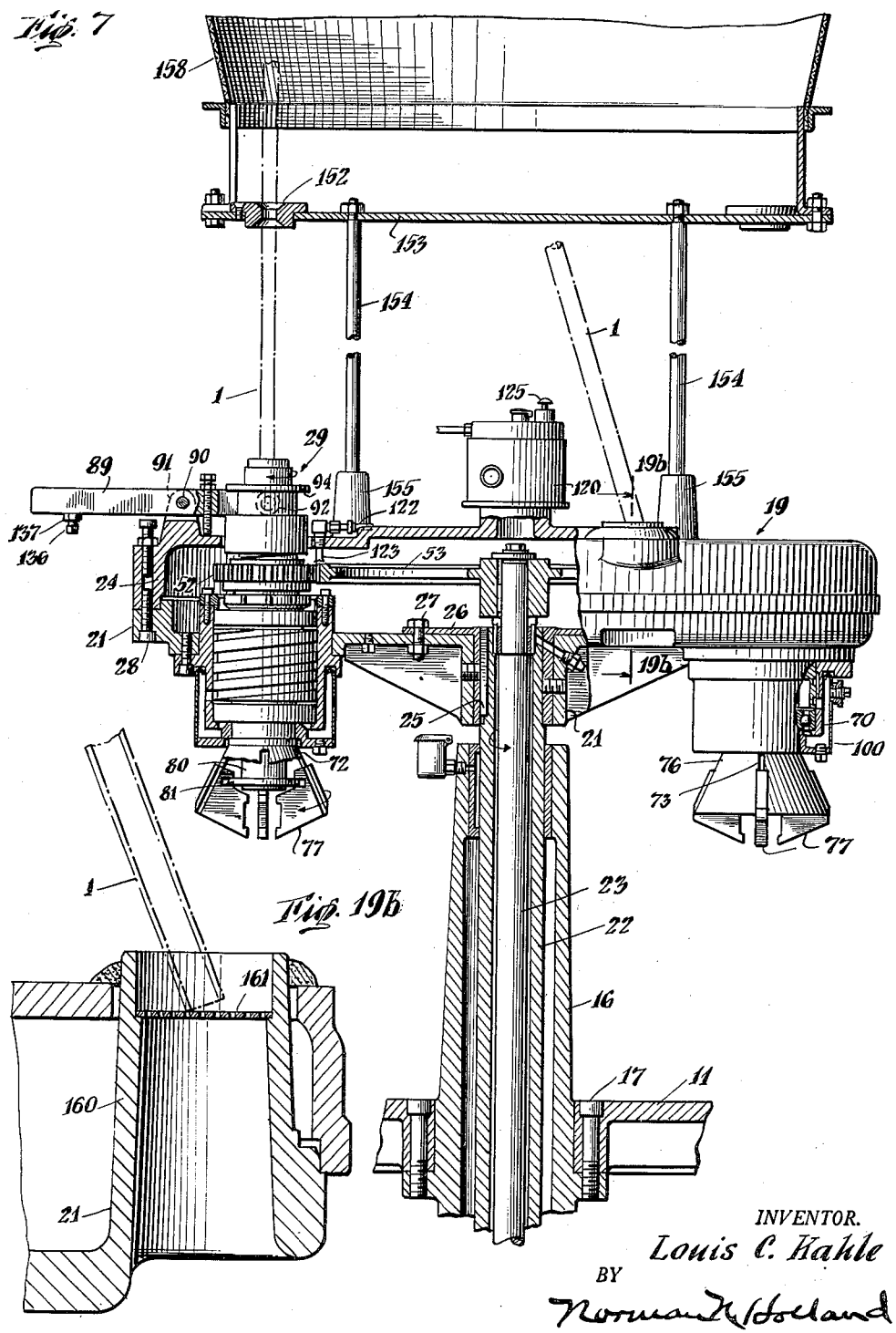
INVENTOR.
Louis C. Kahle
BY
Norman K. Holland
ATTORNEY

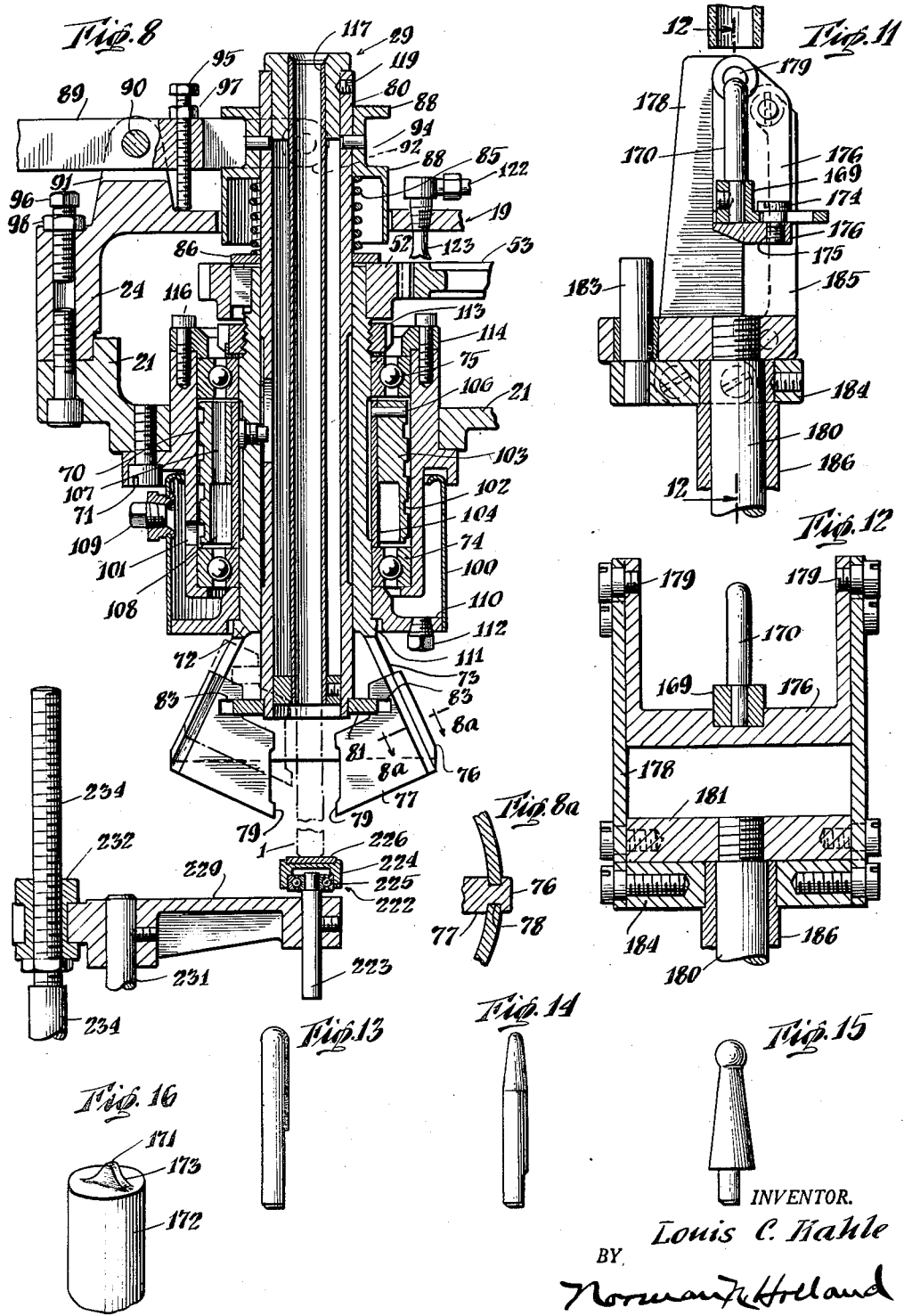

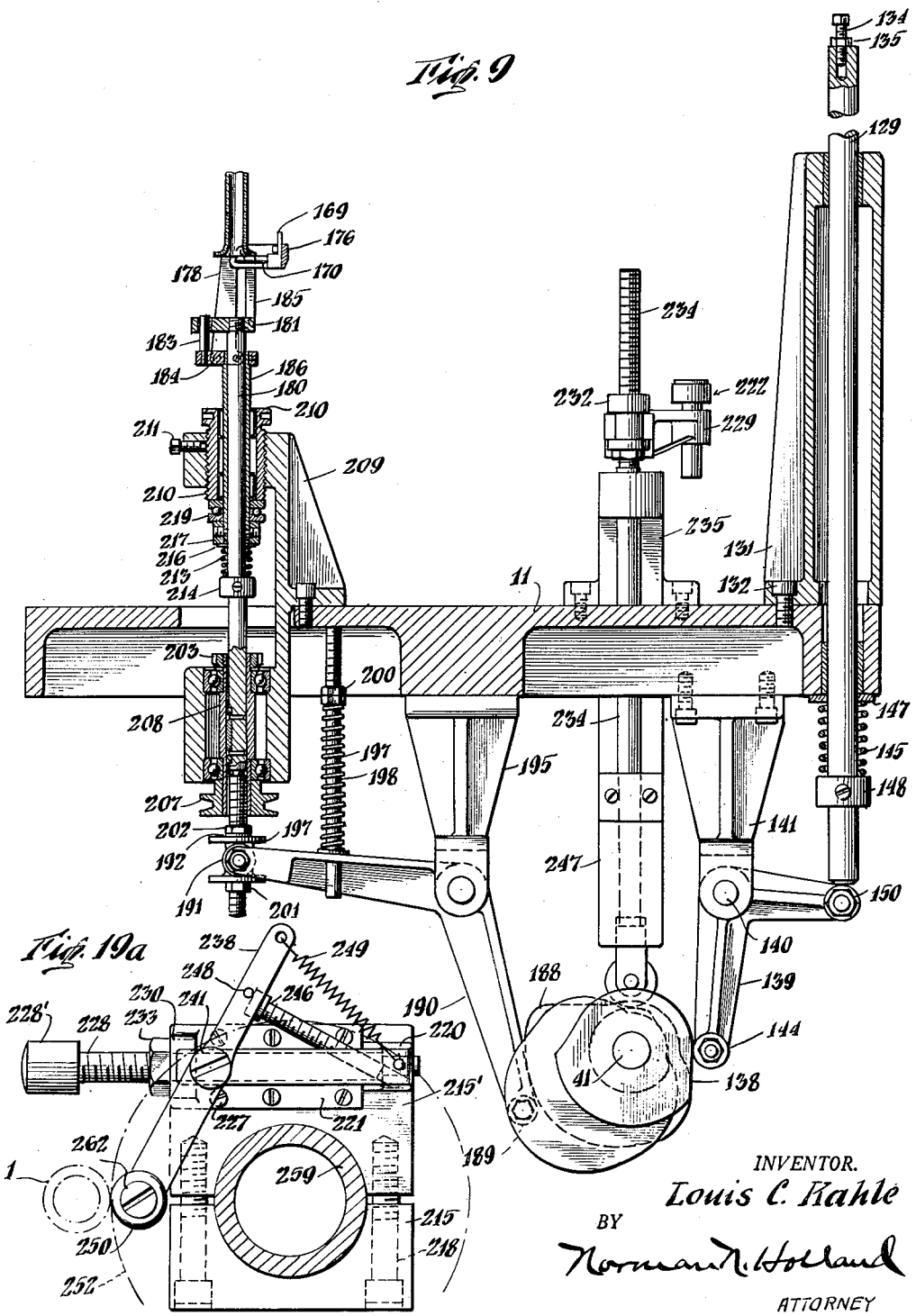

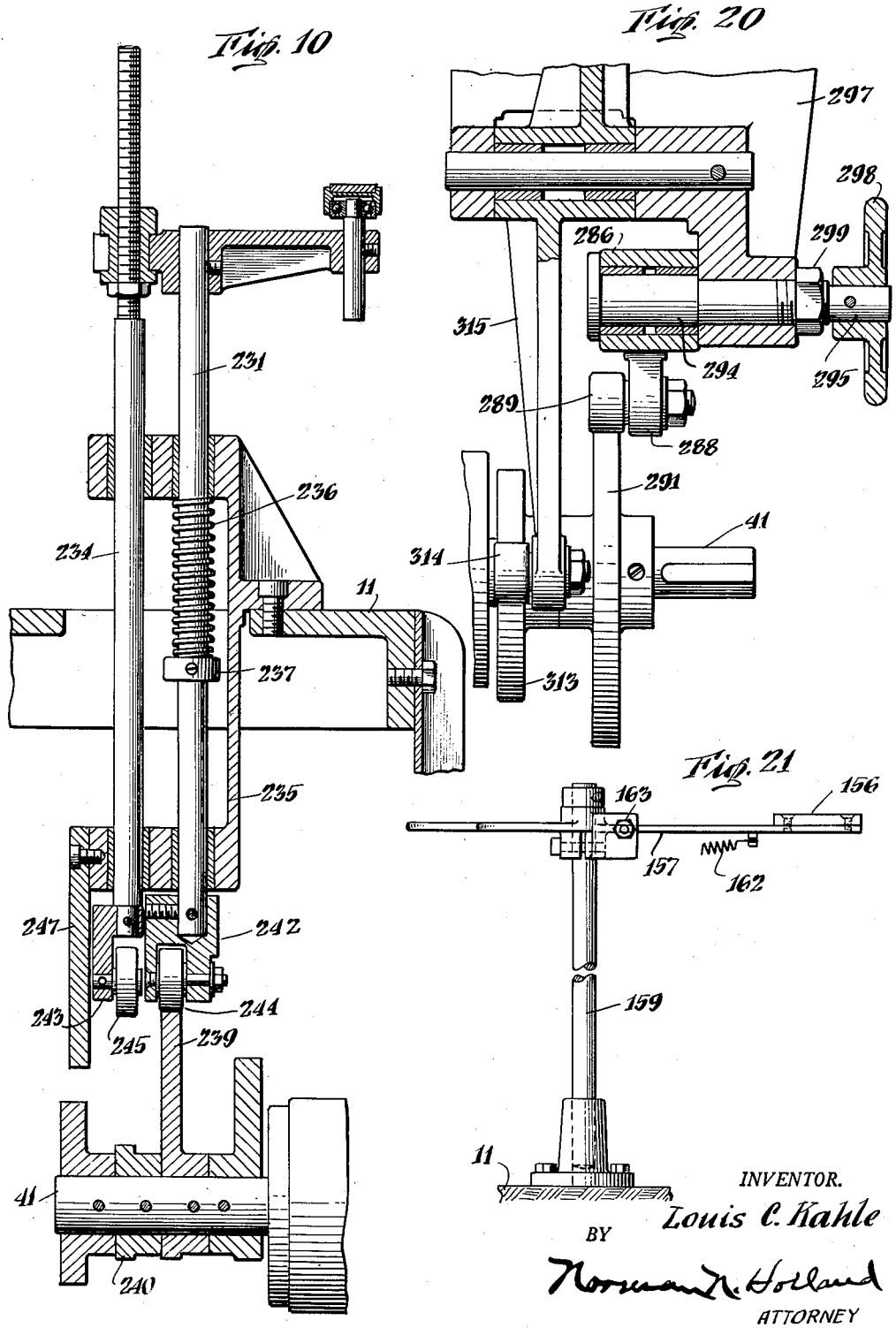

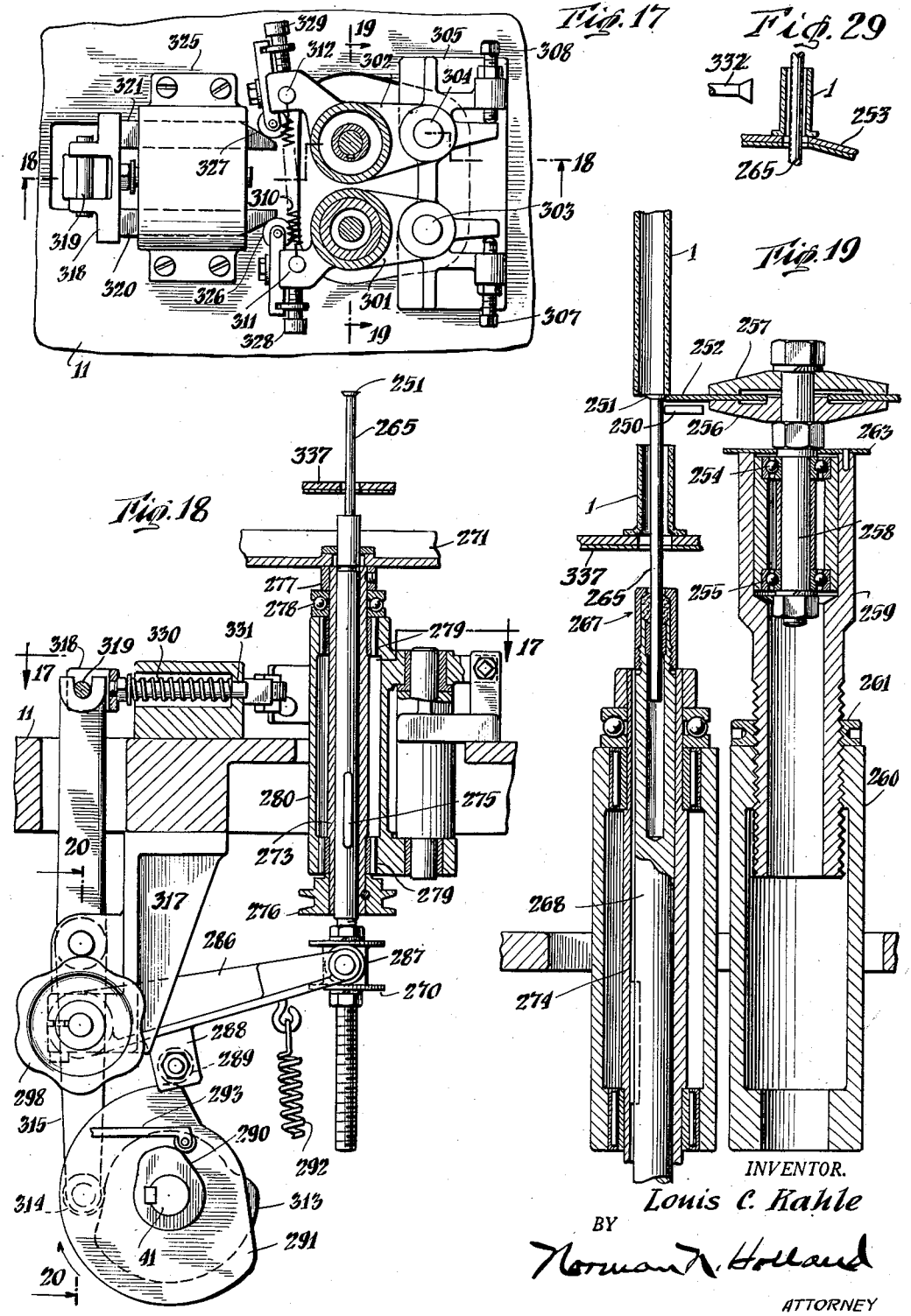

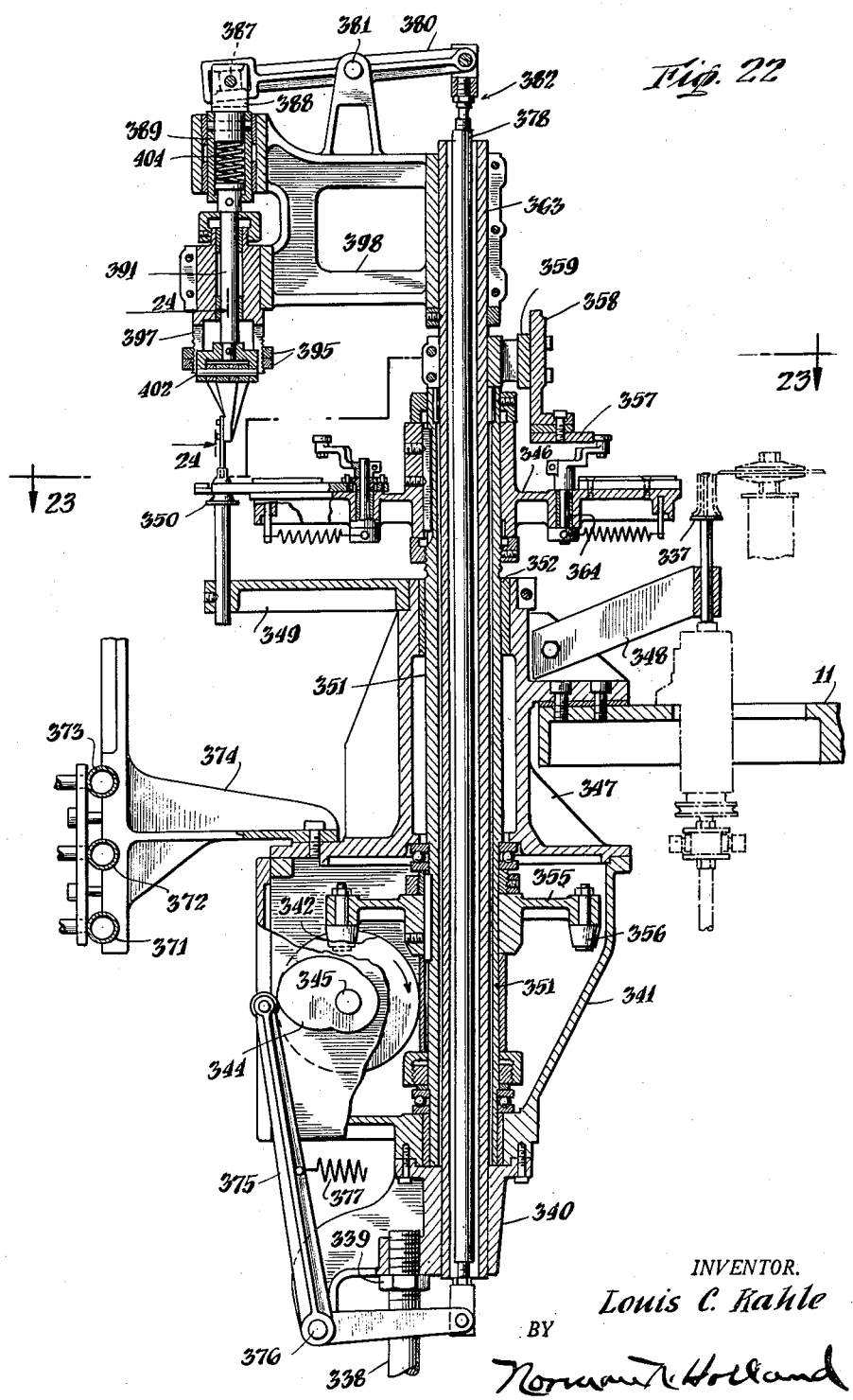

May 13, 1952 L. C. KAHLE 2,596,899
MACHINE FOR MAKING GLASS ARTICLES
Filed May 29, 1948 12 Sheets-Sheet 10
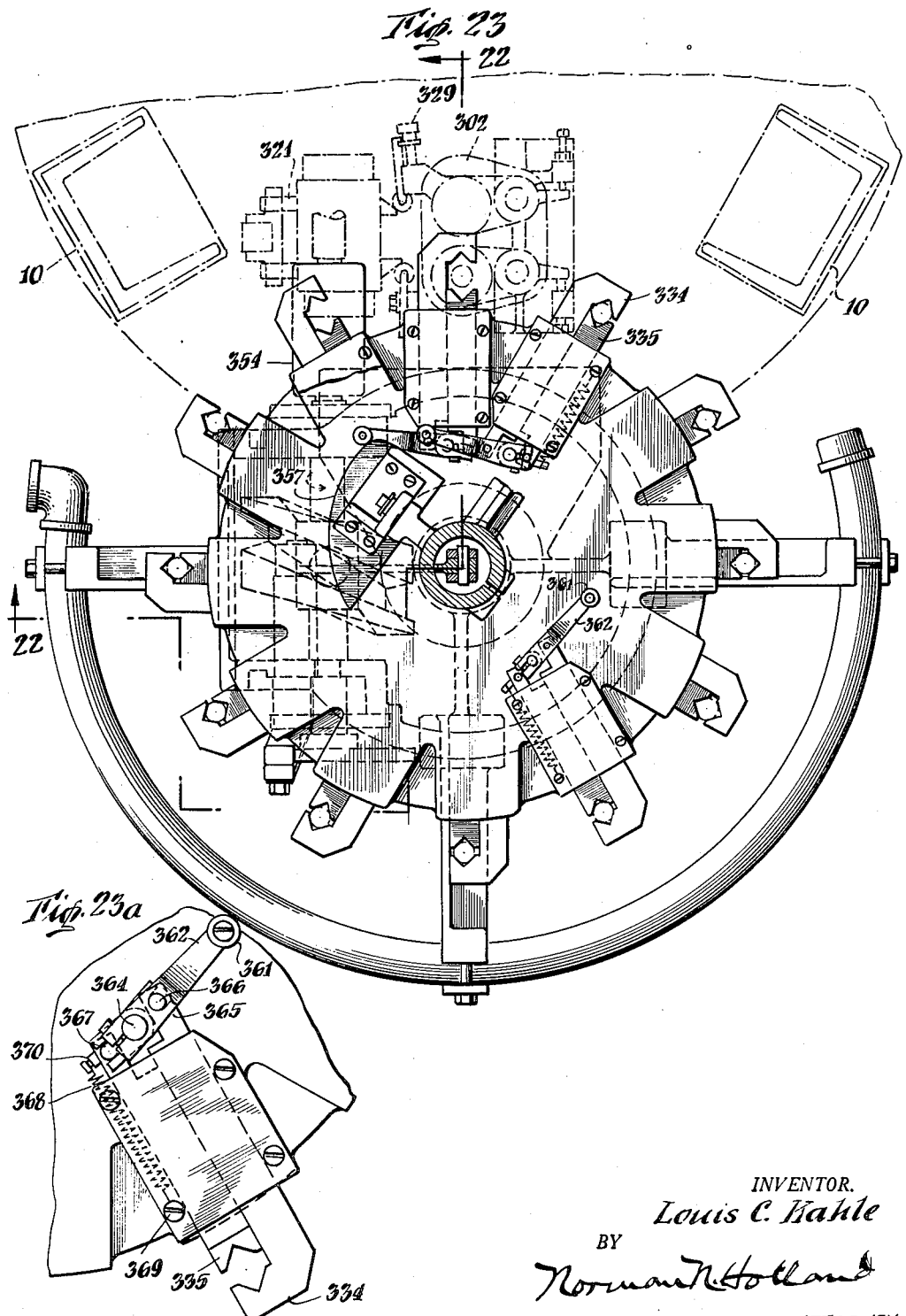
INVENTOR.
Louis C. Kahle
BY
Norman R. Holland
ATTORNEY

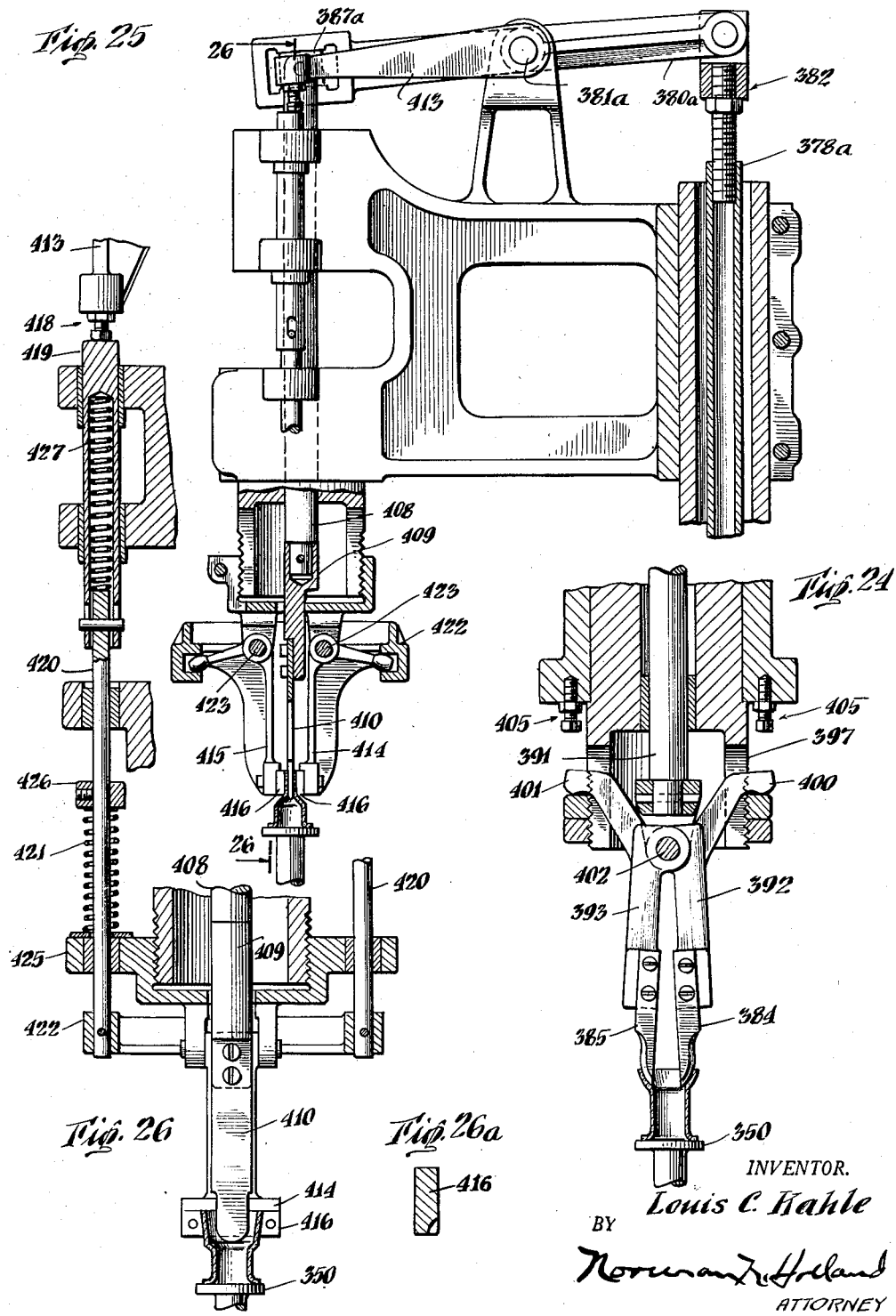

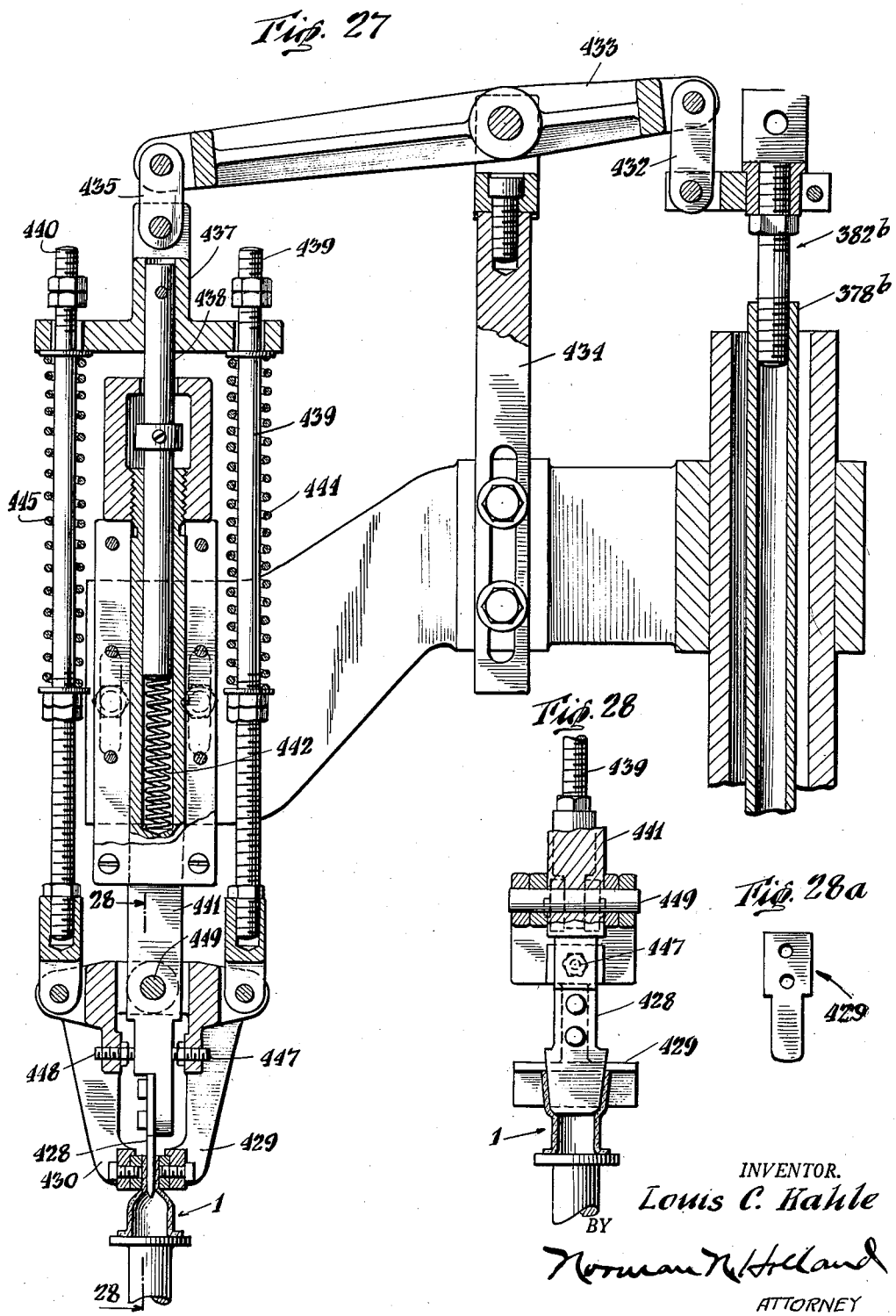

Patented May 13, 1952

2,596,899

UNITED STATES PATENT OFFICE 2,596,899

MACHINE FOR MAKING GLASS ARTICLES

Louis C. Kahle, Teaneck, N. J., assignor to Kahle Engineering Company, North Bergen, N. J., a copartnership Application May 29, 1948, Serial No. 30,018

19 Claims. (Cl. 49—7)

1

The present invention relates generally to the manufacture or shaping of lengths of glass tubing. It relates more particularly to a machine for forming from relatively long lengths of glass tubing, shorter individual glass articles each having an outwardly extending flanged or flared portion at one end thereof and, in many instances, a narrowed or elongated opening at the opposite end.

In the manufacture of many types of radio tubes, incandescent lamps, fluorescent tubes or space discharge tubes, for example, a part of the tube comprises a relatively short glass member through which wires enter the tube and which is formed at one end into an outwardly projecting flange or flared portion. The flange or flared portion facilitates securing together and sealing of the member with a radio tube, bulb or the like.

The manufacture of such flanged or flared articles presents difficulties as they conform to fairly exact standards in order that they may be readily and effectively assembled with cooperating parts to form gas-tight joints. Hand or manual operations and techniques have been extensively utilized to form articles embodying a required degree of exactness and precision. Hand operations result in objectionably high costs. Various mechanical devices have been tried in providing the flanged or flared articles but they have presented objections.

The present invention aims to provide a relatively simple and inexpensive machine adapted to the manufacture of flared or flanged lengths of glass tubing at a rapid rate. The invention further contemplates the provision of a machine which is adapted to the manufacture of various different shapes or types and sizes of flanged or flared glass articles.

Another object of the present invention is to provide a new and improved machine for forming flared or flanged glass articles.

Another object of the invention is to provide a machine for forming flared or flanged glass articles which is readily and selectively adaptable to the formation of different shapes or kinds of such articles.

Another object is to provide a machine for making flared glass articles embodying new and improved lubrication and cooling means.

Another object is to provide a machine for forming flared articles from glass tubing embodying new and improved means for preheating lengths of glass tubing.

A further object of the invention is to provide

2 a machine embodying new and improved means for severing lengths of glass tubing in the formation of flared articles.

A still further object of the invention is to provide new and improved means for forming or shaping an end of a portion of a length of glass tubing.

A still further object of the invention is to provide new and improved means for forming or shaping each end of a portion of a length of glass tubing.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a sectional view illustrating one end of a length of glass tubing prior to any shaping or forming thereof;

Fig. 2 is a sectional view illustrating one form of flared article which may be manufactured by the present machine;

Fig. 2a is a sectional view illustrating another form of article which may be manufactured by the present machine;

Fig. 2b is a sectional view showing a slightly different form of article which may be manufactured by the present machine;

Fig. 3 is a schematic or diagrammatic illustration showing some of the different positions or steps of a portion of the present machine;

Fig. 4 is a view, partially diagrammatic, illustrating one form of lubricating means adapted to be used with the present machine;

Fig. 6 is a vertical sectional view, partly broken away, showing a lower portion of the machine and taken generally along line 6—6 of Fig. 5 but with various devices omitted from the table 11 for purposes of clarity;

Fig. 7 is a partially broken away and partially sectional view, showing an upper portion of the machine above the table 11;

Fig. 8 is a fragmentary sectional view, partly broken away, showing a preferred head for holding lengths of glass tubing; it is taken along a vertical plane through the tubing holder shown at the left of Fig. 7;

Fig. 8a is a fragmentary view taken along line 8a—8a of Fig. 8;

Fig. 9 is a vertical sectional view taken along the line 9—9 of Fig. 5;

Fig. 10 is a view taken along the line 10—10 of Fig. 5;

Fig. 11 is an enlarged view showing the upper portion of the flaring means illustrated at the left side of Fig. 9;

Fig. 12 is a view taken along the line 12—12 of Fig. 11;

Figs. 13, 14 and 15 illustrate flaring pins which may be used with the flaring means illustrated in Figs. 9, 11 and 12;

Fig. 16 is a fragmentary perspective view illustrating another form of flaring means;

Fig. 17 is a fragmentary sectional view, taken generally along line 17—17 of Fig. 18, and showing a cutting or severing means;

Fig. 18 is a view taken along the line 18—18 of Fig. 17;

Fig. 19 is a view taken along the line 19—19 of Fig. 17;

Fig. 19a is a top plan view of means for assisting in holding a length of glass steady and true during a severing operation;

Fig. 19b is a view taken along line 19b—19b of Fig. 7;

Fig. 20 is a view taken along the line 20—20 of Fig. 18;

Fig. 21 is an elevational view showing a gauging attachment for the portion of the machine illustrated in Figs. 5, 6 and 7;

Fig. 22 is a vertical sectional view, taken generally along line 22—22 of Fig. 23, partly broken away, showing means adapted to be used for forming an elongated opening on a flared article;

Fig. 23 is a horizontal sectional view, taken generally along line 23—23 of Fig. 22, showing the means adapted to be used for forming an elongated opening on a flared article;

Fig. 23a is an enlarged fragmentary view showing a portion of the device illustrated in Fig. 23;

Fig. 24 is a view taken along the line 24—24 of Fig. 22;

Fig. 25 is a fragmentary sectional view showing means adapted to be used in the formation of an elongated opening on a flared article;

Fig. 26 is a fragmentary sectional view taken along line 26—26 of Fig. 25;

Fig. 26a is a sectional view showing a preferred form of jaw for the structure shown in Figs. 25 and 26;

Fig. 27 is a fragmentary sectional view, showing another form of device adapted to be used for forming an elongate opening on a flared article;

Fig. 28 is a fragmentary view taken along the line 28—28 of Fig. 27;

Fig. 28a is a view showing another form of member which may be used with the structure illustrated in Figs. 27 and 28; and Fig. 29 is a fragmentary sectional view showing means for ejecting a flared article.

Figure 5:
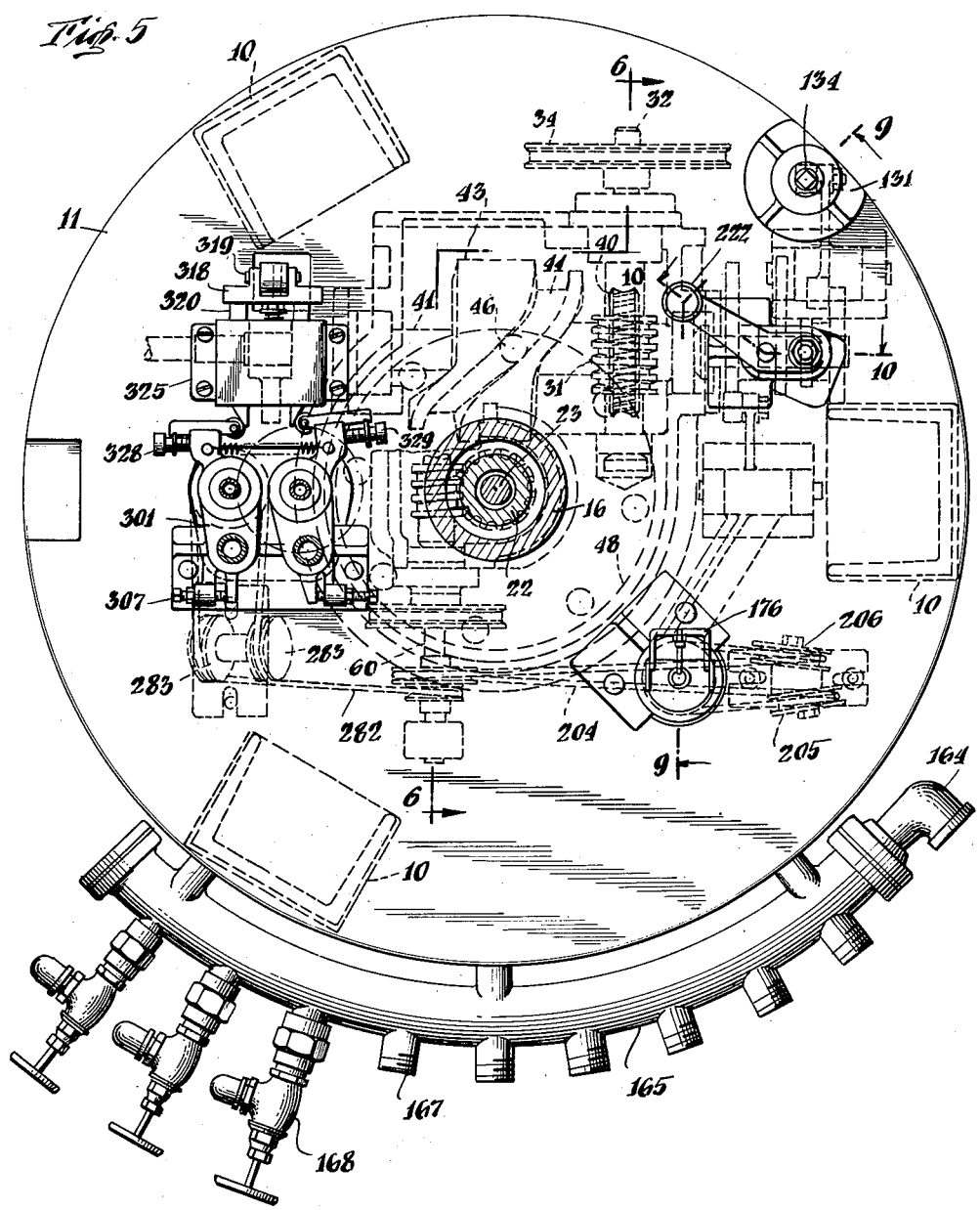
Fig. 5 is a horizontal view looking down toward the table 11 of the present machine, showing the arrangement of parts about the table and with the upright shafts and their hollow support in the section.

The present machine is adapted to receive lengths of glass tubing 1 (Figs. 1 and 7) of any convenient lengths, e. g., three or four feet, and to produce shorter individual articles of desired length having outwardly extending flanges or flared portions 4 at one end thereof and an elongate opening 3 at the opposite end thereof (Fig. 2). The particular form of flared and shaped article illustrated in these figures and its comparative dimensions, are illustrative, the machine being adapted to the manufacture of flared items having different lengths and different flange widths. In addition, flared articles having shapes such as is illustrated in Fig. 2a or 2b may be manufactured by the machine.

In transforming a length of glass tubing or glass cylinder into a plurality of flared articles the length of glass tubing is subjected to a number of operations or steps. Fig. 3 illustrates, more or less schematically or diagrammatically, certain initial operations or steps which may be utilized in connection with the formation of a flared article such as illustrated in Fig. 2, 2a or 2b. As will be brought out in greater detail hereinafter, parts of the present machine move in step by step manner so that various heating, cooling, forming, spreading or stretching, squeezing, and the like operations may occur during intervals while the piece of glass being acted upon is momentarily stopped at a given step, but preferably while the length of glass tubing is rotated about its own axis.

As illustrated in Fig. 3, a rotating length of glass tubing (Fig. 1) has a portion adjacent its lower end subjected to heating at position 1, the heating being achieved by suitable gas burners 5. From heating position 1 the length of tubing is carried to heating position 2, at which position portions adjacent the lower end of the tubing are subjected to an additional heating step by further burners 5. Any suitable number of heating devices or burners may be utilized at the different positions, four burners being shown directing flame jets toward the tubing at heating position 2 and two burners at position 1. After being subjected to the heating at positions Nos. 1 and 2 the length of tubing is moved to position 3, at which position the lower end of the length of tubing is flared outwardly to some such angle or degree as is illustrated at the lower part of the articles illustrated in Figs. 2, 2a or 2b. During the flaring or flanging operation at position 3 the length of tubing may be heated by additional flame jets from additional burners 5.

At position or step No. 4 the flanged article is subjected to a jet of cooling air from an air tube or nozzle 7. This operation is preliminary to a gauging or measuring step at position No. 5 and tends to cool the item by an amount sufficient to insure accurate gauging or measurement. At position 5 the length of glass tubing 1 is momentarily released by gripping or holding means and adjusted or moved vertically by a gauging means in preparation for subjection to a subsequent severing operating which occurs at cut-off position No. 8. During the gauging or measurement of the tubing at position No. 5 the length of tubing is preferably subjected to a jet of cooling air from conduits 7, these air streams tending to render the lower end of the tubing firm.

From the gauging position 5 the flared or flanged length of glass tubing passes to heating positions 6 and 7 where flame jets from burners 5 are effective to heat the article adjacent a severing or cut-off location prior to the tubing being moved to the cut-off position No. 8.

At cut-off position 8, the lower portion of the now flanged and positioned length of rotating glass tubing is severed from the upper portion of the length of tubing. During severing of the lower portion a flame jet is directed upon the tubing adjacent the line of severance. At the proper time an air jet from conduit 7 is directed against the severed lower portion and tends to direct it toward an adjacent removal chute.

As shown in Fig. 3, only heating or cooling operations take place at positions Nos. 1, 2, 4, 6 and 7. Flaring takes place at position No. 3, gauging takes place at position No. 5, and severing or cutting off is done at position No. 8. The arrangement of the heating and cooling steps and burners or air jets, and a greater or lesser number thereof, may be utilized, depending upon the heating or cooling desired for the particular article being manufactured.

The burners or heaters may be of any suitable types and are preferably such as to facilitate ready regulation, adjustment and movement for the desired conditions; the same is true with respect to the various cooling conduits or air jets.

After being cut off at position 8 of Fig. 3 the severed and flared piece of glass may be grasped by jaws of the preforming means (Figs. 22, 23) and moved in step by step manner to various heating positions, and finally to the preforming step which is done at the left side of the machine shown in Fig. 22.

The operations of flanging or flaring, gauging or measuring, severing or cutting off, and preforming, and the means for performing these various operations, will be hereinafter described in detail.

For purposes of convenience of description articles produced by the present machine and illustrated generally in Figs. 2, 2a and 2b will be for the most part referred to hereinafter as "flares."

During performance of the various operations on lengths of glass tubing to manufacture an outturned flange on a flare, a plurality of lengths of tubing 1 are gripped by a plurality of rotatable tube-holding heads 29 which are carried by a revolvable head-carrying turret 19, and the turret is revolved to present the rotating lengths of tubing to the different heating, cooling and operating stations (Fig. 3). The heating burners, cooling jets, flaring means, gauging means, and severing means utilized in forming a flange are mounted, at appropriate intervals, on a stationary table or platform 11 positioned beneath the revolvable turret 19 which carries the rotatable heads 29.

Referring more particularly to Figs. 5, 6 and 7, there is shown a plurality of spaced uprights or legs 10 supporting a table or main platform 11 which is adapted to carry the various operating mechanisms or means for acting upon lengths of tubing in the formation of flares. In order to avoid confusion the various devices shown in Fig. 5 in their relative positions on the table 11 are omitted from the table 11 of Fig. 6. A supplementary platform 13 adjacent the lower portions of the spaced legs 10 and carried by the latter has secured thereto, and supports, electric driving motors 14 and 15, the motors being bolted or otherwise secured on the supplementary platform 13. An upwardly extending hollow member 16, secured to the main platform or table 11 by bolts 17, projects upwardly to a position adjacent a revolvable turret 19. The hollow member 16 carries suitable bearings and maintains in position interiorly disposed drive shafts 22 and 23. One of the drive motors 14 actuates the turret 19 and various operating cams which will be hereinafter referred to. The other drive motor 15 rotates the tube holding heads or means 29, as well as the flaring means (Figs. 9, 11, 12) and the severing means (Figs. 17, 18, 19).

The interiorly disposed drive shaft 22, which extends through the hollow guiding member 16, has mounted thereon adjacent its upper end the revolvable turret 19. The lower portion 21 of the turret 19 is shown fixed to the shaft 22 through a key 25, hub 26 and bolts 27, so that it turns with the shaft 22. The upper portion 24 of the turret 19 may be secured to the lower turret portion 21 by bolts 28 disposed at suitable positions around the periphery of the turret 19.

When the hollow drive shaft 22 is rotated, it serves to rotate the turret 19 and to move around an orbit or path the tube-gripping heads 29 carried by the turret. Preferably the shaft 22 and turret 19 are caused to move in step by step movement so that the heads 29 carried thereby are moved to different positions or stations and momentarily stopped in their orbital path thereat so that various heating, cooling and operating steps may be performed upon lengths of rotating glass tubing held by the rotating heads 29.

While any suitable number of heads 29 may be utilized, spaced appropriately about the circumferences of the turret 19, eight equi-distantly spaced heads have been found efficient in practice.

Step by step rotation of the drive shaft 22 and of the turret 19 may be achieved by the mechanism illustrated more particularly in Fig. 6 beneath the main platform 11. As illustrated, a continuously rotating drive motor 14 turns a gear 31 on the shaft 32 through the intermediation of pulley 34, drive belt 35, speed adjusting or control mechanism 37, drive belt 38 and pulley 39. The rotating gear 31 serves to rotate a meshing worm wheel or gear 40 mounted upon a shaft 41 and rotation of this shaft effects rotation of an indexing cam 43 keyed to the same shaft 41 as the gear 40. Indexing cam 43 is provided with a suitably shaped groove 44 adapted to receive rollers 46 carried by a cam wheel 48 fixed by key member 49 to the hollow upwardly extending shaft 22. The shape of the effective driving portions of the index cam 43 is preferably such as to impart slow starting movement, slow stopping movement and relatively rapid intermediate movement to the cam wheel 48 and shaft 22; thus there are provided relatively slow stopping and starting movements of the turret 19 and heads 29 in their movement from station to station and relatively rapid movement to the turret 19 and heads 29 intermediate stations.

The cam wheel 48 is shown (Fig. 5) provided with the same number of rollers 46 as the number of heads 29 carried by the turret 19. The index cam 43 is effective upon only a single roller at a time, the different rollers coming successively into position upon rotation of the index cam 43. The harmonic acceleration and deceleration, combined with rapid intermediate movement, provides for relatively high speeds of operation of the machine without damaging of parts. Selective adjustment of the speed of indexing or movement of the turret 19 and heads 29 from station to station may be obtained through the speed adjustment mechanism 37 and its operating or selecting handle 50. The speed of the turret 19 which moves the heads from station to station may be readily adjusted or changed independently of other portions of the machine.

It is desirable in connection with manufacture of the flares that the glass-tube-gripping means of each of the heads 29 be rotated during heating, cooling, gauging, flaring and severing operations. Such rotation contributes to the production of uniform flares. As shown in Figs. 6 and 7 this rotation is achieved by driving motor 15 operatively connected with each of the heads 29 through the intermediation of chuck spindle drive gear 52 secured to jaw operating spindle 80, main drive gear 53 keyed to the upper end of drive shaft 23, worm gear 55, meshing gear 56, shaft 58, pulley 59, drive belt 61, speed adjustment mechanism 62, drive belt 64 and pulley 65. Selective adjustment of the speed control mechanism 62 may be achieved by suitably positioning the selecting handle 67 of the speed control mechanism 62. As the motor 15 continuously rotates it serves to rotate the main drive gear 53 secured to the upper end of the drive shaft 23 and rotate each of the spindle drive gears 52. The spindle drive gears 52 rotate continuously, during both movement of the turret 19 and during intervals when the turret 19 is stationary.

Drive motor 15 actuates the chuck rotating spindles 80 entirely independently of rotation of the turret 19. It will be hereinafter brought out that drive motor 15 also operates the flaring device and the severing devices; hence each of these two latter devices may be controlled independently of rotation of the turret 19. The speed of either of the drive motors 14 and 15 may be readily changed without affecting the other. For purposes of adjustment or otherwise either of the drive motors may be completely shut down while the other continues to operate; the flexibility of operation thus afforded is highly valuable.

The glass-tube-carrying heads 29 are illustrated more particularly in Figs. 7 and 8 of the drawings. Each of the heads carried by the turret is similar and a description of one will suffice for all. Each of the heads shown in these figures comprises a housing 70 which may project through an aperture in the lower turret member 21 and which may be secured into position by bolts 71. The housing 70 contains an interiorly disposed chuck mechanism adapted to normally hold a length of glass tubing and which is adapted to be rotated through spindle 72, rotatably mounted in roller bearings 74 and 75 disposed adjacent the upper and lower portions of the housing 70, is provided adjacent its lower end with outwardly flared and slotted portions 76, the latter flared portion of the spindle having slidably assembled therewith flare jaws 77. Three flare jaws may be spaced substantially equidistantly about the flared portion 76 of the chuck spindle 72, each flare jaw being provided with oppositely disposed grooves 78 fitting over and slidable along portions of the flared chuck spindle at opposite sides of slots 73 formed at equidistantly spaced intervals around the chuck spindle (Fig. 8a).

The flare jaws 77 may move freely lengthwise of the spaced slots 73; when the flare jaws are adjacent the lower edges of the slots 73 their inner gripping or glass engaging portions 79 are separated with respect to each other. As the flare jaws are moved upwardly along the slots 73, the inner glass engaging edges 79 thereof approach toward each other and toward a length of glass tubing centrally disposed with respect to the jaws. Thus movement of the flare jaws along the slots 73 of the chuck spindles 72 serves to open and close the chuck jaws with respect to an intermediate length of glass tubing.

Movement of the flare jaws 77 along the slot 73 is shown achieved by jaw operating spindle 80 having secured adjacent the lower portion thereof an outwardly extending collar 81. The collar 81 projects into slots 83 of the flare jaws 77. When the jaw operating spindle is moved upwardly the collar 81 tends to lift the flare jaws upwardly and the outwardly flared portion of the chuck spindle 72 effects inward movement of the flare jaws. When the jaw operating spindle 80 moves downwardly, the lower flared portion of the chuck spindle 72 effects separation of the flare jaws with respect to each other and the flare jaws move outwardly with respect to the collar 81 of the jaw operating spindle. A spring 85 resting against a washer-like member 86 adjacent its lower end and against the under side of a jaw operating collar 88 keyed or pinned to the jaw operating spindle 80, normally urges the jaw operating spindle 80 upwardly and thus normally tends to maintain the flared jaws 77 together or in gripping engagement with a length of glass tubing.

Actuation of the flare jaws to grip or release a length of glass tubing is achieved by a chuck-operating lever 89 movably mounted on a pin 90 secured to upwardly projecting bosses 91 on the upper turret portion 24. The inner end of the chuck operating lever 89 is forked or bifurcated and carries roller members 92 which extend into a groove 94 of the jaw operating collar 88. The mechanism for moving the clutch operating lever 80 will be hereinafter described. If desired the limits of movement of the chuck-opening lever 89 may be controlled by adjusting screws 95 and 96 and lock nuts 97 and 98; either one or both of the adjusting screws may be used.

Since the turret 19 and heads 29 carried thereby are disposed above and during operation rotate through rising heat generated by the various heating burners mounted on the main table or platform 11, lubrication and cooling of rotating parts of the heads 29 becomes a most serious and important consideration. The chucks and bearings and other moving parts or elements of the heads 29 move through highly heated areas and the temperature of these various parts quickly reaches an elevated value; in order to prevent damaging of parts consequent upon the elevated temperatures involved it is most desirable that bearing portions of the heads 29 be continuously and amply lubricated. In the construction of Figs. 7 and 8 this is achieved by forcing or lifting oil or other suitable cooling and lubricating fluid from an exposed oil retainer or reservoir 100 to a position adjacent the bearing 75, from which position the cooling and lubricating fluid returns by gravity to the reservoir 100. In operation the reservoir 100 is kept filled with liquid to a satisfactory level and the latter passes through one or more openings 101 into a spirally arranged groove 102 of a fluid feeding member 103. The fluid feeding member 103 is shrink fitted over a sleeve 104 and secured thereto by a pin 106. An aluminum feed member 103 and steel sleeve 104 are satisfactory. The reservoir 100 is supported in position by its bottom member 110 which rests against a ledge 111 of the chuck spindle 72, the reservoir rotating with the chuck spindle. The inner race of bearing 74, sleeve 104, and the inner race of upper bearing 75 are maintained in position by a bearing retainer 113 threaded onto the chuck spindle 72 and they rotate with the chuck spindle. A securing member 114 retained to the housing 70 by bolts 116 maintains the parts in position within the housing 70.

In addition to serving as a reservoir, the exposed chamber 100 serves as a cooling chamber for oil or other lubricating fluid which has its temperature raised incident to lubrication of head bearings 75. The rotatable feed member 103 serves to continuously circulate the fluid during normal operations.

As the fluid feeding member 103 rotates with the chuck spindle 72, the spirally arranged feeding groove 102 serves to forcibly move fluid from the reservoir 100 upwardly intermediate the exterior of the fluid feeding member and the adjacent interior surface of the housing 70. Preferably the interior diameter of the housing member 70 is approximately 8/1000 of an inch greater than the exterior diameter of the fluid feeding member 103 to thus provide a space of approximately 4/1000 of an inch around the fluid feeding member 103 when the parts are at ordinary room temperatures. Fluid discharged by the fluid feeding member 103 adjacent the upper end thereof passes to and lubricates and cools the upper ball bearings 75 and then returns by gravity to the reservoir 100 through return passage 107 and apertured portion 108 of the fluid feeding member 103. The lower ball bearing 74 is usually immersed in oil. Each reservoir 100 may have a filling plug 109 in the wall thereof and a drain or clean-out plug 112 at a lower point.

It is desirable that lengths of glass tubing be guided accurately through the chuck spindle 72, that they be maintained centrally disposed with respect to the chuck spindle, and that provision be made for feeding new lengths of glass tubing into the chucks prior to a previously inserted length of glass tubing being "used up." The latter-mentioned feature is a most desirable one since it makes possible the continuous manufacture of flares, without periodic interruptions and loss of production consequent upon insertion of fresh lengths of glass tubing. These advantageous features may be achieved by glass tubing guides 117 positioned interiorly of the chuck spindles 72 and retained therein by one or more set screws 119. Glass tubing guides 117 may be manufactured of different diameters to accommodate different diameters of glass tubing, suitable diameter glass tubing guides being inserted into the chuck spindle 72 for guiding corresponding or complementary diameters of glass tubing. Where the glass tubing utilized is of relatively small diameter, relatively small diameter tubing guides 117 will be utilized, and in instances where the glass tubing is of relatively large diameter, a correspondingly larger glass tubing guide will be inserted and utilized. In some instances the glass tubing to be formed into flares may be of a diameter corresponding approximately to the interior diameter of the chuck spindle itself, and in this instance the glass tubing may be inserted directly into and through the chuck spindle, without first inserting a glass tubing guide 117.

As previously pointed out, rotation of the moving parts of each of the heads is achieved through chuck spindle drive gear 53, drive shaft 23 and driving motor 15. The speed of rotation of the head chucks may be regulated by suitably adjusting the speed control mechanism indicated generally in Fig. 6 by the reference character 62; such speed adjustments may be made entirely independently of the speed at which the heads are moved around and orbit by the turret 19 and drive motor 14.

Lubrication of the meshing portions of the various chuck spindle drive gears 52 and intermeshing main drive gear 53 is facilitated by a "one-shot" lubrication system illustrated in Figs. 4 and 7. A main oil reservoir 120 is connected by suitable conduits 122 with outlet nipples 123 threaded into the upper portions 24 of the turret 19. The discharge openings of the nipples 123 are positioned adjacent the intermeshing portions of the spindle gears 52 and main drive gear 53. Upon actuation of the button 125 oil feeds from the reservoir 120 through the conduits 122 and is discharged immediately adjacent the intermeshing portions of the gears of each of the heads 29. The oil discharged at the nipple 123 also moves downwardly and assists in lubricating the upper ball bearings 75 of each of the heads 29. Additional conduits may lead from the reservoir 120 to any other parts which may require lubrication.

Movement of the chuck-operating lever 89, to open and close the chuck jaws 77, is achieved at periodic intervals by an operating rod 129 (Figs. 5, 7 and 9) which extends through and is guided by a bracket member 131 secured by bolts 132 to the main platform or table 11. The upper end of the operating rod 129 may have an adjustment screw or bolt 134 and lock nut 135 for varying the effective length and operating instant of the rod in contacting outwardly projecting portions of the chuck operating levers 89. Preferably each of the chuck operating levers 89 is provided with an adjustment screw or bolt 136 and lock nut 137 for facilitating correct operation of the levers to open and close the flare jaws 77 at the correct time.

Only a single operating rod 129 is utilized, each of the heads 29 and chuck-operating levers 89 being moved successively into alignment with the upper end of the operating rod 129. The rod is effective to move each chuck operating lever 89 in succession, to thus permit insertion of a fresh length of glass tubing through the particular head 29, or to facilitate downward movement of a length of tubing in connection with a gauging or measuring operation which will be later described.

The chuck-operating rod 129 is actuated by the drive motor 14 through the intermediation of the drive belt 38, speed control mechanism 37, drive belt 35, shaft 32, meshing gears 31 and 40, shaft 41, operating cam 138, and lever or bell crank 139, the rod-operating lever 139 being movably mounted on a pin 140 carried by a bracket 141 bolted to the underside of the main platform 11. Cam roller 144 is normally urged against the operating surface of the cam 138 by a spring 145 positioned around the operating rod 129 and resting against a washer 147 and the upper side of a collar member 148 secured to the rod 129 by a set screw. The spring 145 normally urges the operating rod 129 downwardly so that its lower end presses against a roller 150 carried adjacent the outer end of one arm of the bell crank or lever member 139.

The rod-operating cam 138 is fixedly secured to the drive shaft 41 and has a profile or shape to effect upward movement of the operating rod 129 to open the chuck of a head 29 adjacent gauging position No. 5. The cam profile preferably maintains the chuck in open position for a sufficient period of time to facilitate insertion of a new length of glass tubing or gauging movement of a length of glass tubing with respect to the chuck jaws of the particular head 29. Upon gauging adjustment of the length of glass tubing or insertion of a fresh length of tubing, the operating cam 138 will have rotated by an amount permitting the spring 145 to urge the operating rod 129 downwardly; as downward movement of the operating rod 129 occurs, the head spring 85 of a head 29 tends to lift the jaw operating collar 88 and to effect closing of the chuck jaws 77 about the periphery of an interiorly disposed length of glass tubing. Closing of the chuck jaws preferably occurs adjacent the gauging position 5 (Fig. 3).

As illustrated in Fig. 7, a freshly inserted length of glass tubing extends substantially vertically through the head 29, the upper portion of the length of tubing initially extending through a guide bushing 152 of a plate member 153 carried by support rods 154. The support rods 154 may be held by suitable bosses 155 at the upper portion of the turret 19 so as to rotate with the turret and to carry the plate member 153 therewith. The guide bushings 152 carried by the plate member 153 are disposed above and in alignment with the openings through the heads 29, one of the guide bushings being provided for each of the headings 29. A basket-like structure 158 of wire or other suitable material preferably extends upwardly from the bottom member 153 to minimize the possibility of accidentally broken lengths of glass tubing falling upon a workman to injure him and to minimize such accidentally broken pieces of glass tubing falling into or upon the machine.

It is highly desirable that lengths of glass tubing be preheated prior to their insertion into the gripping jaws of a head 29. This is particularly desirable where it is possible to utilize what might otherwise be waste heat generated by various burners 5 illustrated in Fig. 3. Excess heat generated by these burners rises from the burners and tends to raise the temperature of upwardly disposed portions such as the heads 29, turret 19, plate member 153 and basket 158. In order to utilize and control to a certain extent the heat which thus rises there is preferably provided adjacent each of the heads 29 an opening or chimney-like means (Figs. 7 and 19b). As illustrated in Fig. 19b an opening or chimney-like means comprises a tubular portion 160 of the lower part 21 of the turret 19; the chimney-like structure tends to gather and direct through the chimney-like opening heated rising air and to discharge it from the upwardly disposed open end of the chimney-like structure. A perforated screen, plate or other suitable member resting upon a ledge at the interior of the preheating opening provides a support or rest for the lower end of a length of glass tubing placed in alignment with the opening. Heat discharged from the upper end of the chimney-like structure may pass upwardly through and around portions of the hollow length of tubing. Thus the openings or chimney-like structures tend to gather heat and direct it to and through lengths of glass tubing which have their lower ends resting upon the perforated plate or screen 161.

Initially a length of glass tubing will preferably be positioned so that its lower end rests against the perforated plate 161. Heat rising from burners 5 tends to preheat the entire length of tubing. At the proper time, when the chuck jaws 77 are in open position, the fresh length of tubing may be lifted by an operator from the crimney-like structure 160 and the lower end inserted downwardly into a head 29 the proper distance; upon closing of the chuck jaws 77 the glass tubing will be securely retained for rotation and for movement around an orbital path by the turret 19.

Upon insertion of a fresh length of tubing into an empty chuck there may be utilized an auxiliary gauging device (Fig. 21) which has a platform 156 serving to limit the extent of downward movement of the tubing. The platform 156 is located at the point or height at which cutting normally takes place (at the cut-off position No. 8); the tubing position thus obtained is such that the lowermost end of the glass tubing is maintained at the level of the severing means and if not cut off when it reaches cut-off position No. 8. Thus there is minimized wastage of unflared lengths of glass tubing at the cut-off position; the freshly inserted stick of tubing is hence not cut off but goes to the flare-forming position as though it has been cut off. The platform 156 may be carried on an arm 157 which is rotatably or swingably mounted on an upright 159. A spring 162 may be connected with an adjacent stationary part of the machine to urge the arm out of the path of moving parts and into contact with a set screw 163.

After being provided with a flange at flaring position 3 the tubing moves downwardly an additional distance at gauging position 5, upon opening of the chuck jaws 77 by the chuck-operating lever 89 and operating rod member 129. A flanged length is severed from the tubing at cut-off position 8. During successive passages around its orbit the piece of glass tube will gradually feed downwardly through a head and its length will continually decrease as additional flanged pieces are formed.

When an initial length of tubing has moved downwardly so that its upper end no longer projects through a guide bushing 152 of the plate member 153, a fresh length of glass tubing may have its upper end inserted through a guide bushing 152 and its lowermost end rested against the perforated plate or screen 161 of a preheating opening 160. When the upper end of an initial length of glass tubing has moved below the upper end of a tubing guide 117 a head 29 is ready to receive a succeeding length of tubing; the lower end of a preheated length of tubing may be moved into alignment with and inserted into the tubing guide 117, for downward feeding through the head 29 and conversion into a plurality of flanged pieces or flares. A fresh length of glass tubing may be inserted into a guide and chuck at any desired position, as soon as a chuck guide 117 is ready to receive it. Thus it will be seen that during the manufacture there may be the succeeding length of tubing in preheating position ready for insertion into operative engagement with a head 29. In other words, for each glass rod being operated upon there may be, for most of the time, an additional glass rod in preheating position ready to be substituted.

In instances where a chuck may become emptied of a length or "stick" of glass tubing, a fresh length is preferably inserted at any location of the chuck during its orbital path, other than at gauging position No. 5; when the chuck and its freshly inserted stick reaches gauging position No. 5, the chuck jaws are automatically opened and the stick moves downwardly for correct positioning or gauging. For purposes of convenience the actual cycle may be considered as beginning at heating position 1.

Heating may be achieved by suitable mixtures of air and gas, with or without additional oxygen; the gas feeding through an inlet conduit 164 to a manifold 165, from which the gas passes through suitable discharge openings 167, control valves 168 and appropriate connecting conduits (not shown) to the burners 5. Any suitable arrangement and number of manifolds, control valves, conduits and burners may be utilized for heating the glass tubing. The heating which occurs at positions 1 and 2 is preliminary to formation at position 5 of an outwardly extending flange or edge.

The means for outwardly flaring the lower edge of a length of glass tubing is illustrated more particularly at the left side of Fig. 9 and in Figs. 11 through 15. As shown in these figures a flaring pin 170 is first inserted vertically into the lower end of the rotating length of glass tubing and is thereafter moved from vertical position toward horizontal position, the extent of movement from the substantially vertical to horizontal position being determined by the degree of angularity of the flange which it is desired to form at the lower end of a piece of glass tubing. In instances where it is desired to form a substantially right angle flange (Fig. 2a) the forming pin 170 will be moved to substantially horizontal position. In instances where it is desired to form an inclined flange (Fig. 2b) the extent of movement of the flare forming pin 170 will be less than to full horizontal position.

The pin is preferably bodily rotated in a direction opposite to the direction of rotation of the length of glass tubing upon which it is adapted to form a flange. In some instances it might be desired to rotate them in the same direction but at different speeds. As illustrated in Figs. 9, 11 and 12 the flange-forming pin 170 is retained in a pin-bracket 169 by a screw 175, the pin bracket 169 being adjustable to shift the lateral setting or position of the pin 170 upon loosening of the retaining screw 174 which extends through an opening in the pin bracket 169; the pin bracket is carried at the base of a substantially U-shaped yoke member 176, the yoke member 176 being movably supported adjacent one end thereof on a bracket member 178 by pivot members 179. In initial position (Figs. 11 and 12) the flange-forming pin 170 is disposed in substantially vertical position for entry into the lower end of an adjacent length of glass tubing. Upward movement of the flange-forming pin into the length of glass tubing may be achieved by vertical movement of an operating shaft 180. As the operating shaft 180 is moved upwardly from the position illustrated in Figs. 11 and 12 the shaft lifts an apertured member 181, movement of the apertured member 181 being guided by spaced guide pins 183 carried by a sleeve top member 184, and as the apertured member 181 is moved upwardly a connecting member 185 pivotally joined adjacent its lower end with the apertured member 181 and at its upper end with the substantially U-shaped member 176 tends to rotate the substantially U-shaped or yoke member 176 about the pivot pins 179 upon which the latter is mounted. The offset pivotal mounting of the upper end of the connecting member 185 tends to swing the yoke member 175 outwardly toward a horizontal position illustrated more particularly in Fig. 9. Movement of the yoke member 176 toward horizontal position correspondingly moves the flange-forming pin 170. Rotation of the pin 170 and bracket 176, with respect to rotation of the heated glass tubing, is effective to flare or turn the substantially molten end of the glass tubing outwardly and upwardly to form an angularly disposed flange.

Vertical movement of the flange-forming pin 170 and its operated shaft 180 may be achieved by the drive shaft 41 through the intermediation of operating cam 188 keyed thereto, roller 189, bell crank 190, rollers 191, and lift collar 192. The bell crank 190 may be pivotally mounted upon a bracket 195 bolted to the underside of the main platform or table member 11. The bell crank is shown normally urged toward downward position, so that the roller 189 remains in contact with the operating profile of the cam 188, by a spring 197 which extends about a shaft 198 carried by the main platform 11, the tension or effectiveness of the spring being suitably varied by an adjusting nut 200 threaded onto the shaft 198. Adjustment of the amount of lift or movement of the operating shaft 180 may be obtained by appropriately shifting the position of the lift collar adjusting nuts 201 and 202 to thus locate the lift collar 192 at such position as is appropriate for obtaining the amount of movement desired.

Rotation of the flange forming pin and its operating shaft 180 may be by the drive motor 15 through the drive belt 64, speed control mechanism 62, drive belt 61, pulley 59, drive shaft 60, pulley 63, drive belt 204, guide pulleys 205 and 206 (Fig. 5) and pulley 207 keyed or otherwise secured to a drive sleeve 208, the latter drive sleeve being suitably keyed or otherwise secured with the drive shaft 180 so that the latter may move longitudinally through the drive sleeve 208. The drive sleeve 208 is rotatably mounted on suitable ball bearings carried by the flare former bearing bracket 209 and the sleeve and bearings are retained in place by the upper side of pulley 207 and a bearing retainer 203 threaded onto the sleeve 208.

The sleeve 186 which carries the sleeve top member 184 is rotatably mounted within a cylinder-like adjusting nut 210 that is retained in position within an arm of the flare former bearing bracket 209 by set screw 211. The adjusting nut 210 is preferably provided with needle bearings at the interior thereof for facilitating rotation of the sleeve 186. A spring 213, resting at its lower end against a collar 214 secured to the shaft 180, presses at its upper end against a supporting washer 216 and the washer in turn bears against a collar 217 secured by set screws to the lower end of the sleeve member 186; the spring 213 thus maintains the sleeve member 186 in desired upper position. A ball thrust bearing 219 may be positioned intermediate the lower end of the adjusting nut 210 and the sleeve collar 17 to minimize friction.

While a substantially straight flange-forming pin 170 is illustrated in Figs. 9, 11 and 12 it may in some instances be desired to utilize a different shape or size of pin for a flange at the lower end of a length of glass tubing. The flange-forming pins illustrated in Figs. 13, 14 and 15 are examples of other shapes of flange-forming pins which may be inserted into the flare forming mechanism in lieu of the particular pin 170 illustrated in Figs. 9, 11 and 12.

The flaring mechanism of the swing-out pin type perfectly simulates hand flaring techniques. The tool rotates as it rises and swings outwardly in an arc. Provision is made for making of any and all adjustments which may be deemed desirable.

In some instances there may be employed a flare-forming tool of the "spade" type shown in Fig. 16. The tool of this figure has a substantially centrally disposed projection or protuberance 171 extending upwardly from the forming tool 172. As the rotating lower end of the length of glass tubing is contacted by the tool 172 inclined portions 173 tend to direct the lower edge of the length of tubing outwardly to form a flange at the lower end of the tube. In addition to rotation of the length of tubing the forming tool is also rotated and preferably this latter rotation is in a direction opposite to that of the head 29 and length of glass tubing carried thereby.

Upon completion of a flanging or flaring operation the drive motor 14 and indexing cam 43 cause the latter to move the turret 29 so as to shift the flanged length of tubing to cooling position 4 (Fig. 3) where the lower end of the glass tube is subjected to jets of cooling air. The jets of cooling air from the conduits or nozzles 7 serve to render the glass less plastic prior to its movement to gauging position 5. The drive motor 14, index cam 43 and intermediate mechanisms move the flanged and cooled length of tubing from position 4 to gauging position 5.

At gauging position 5 the glass tubing is subjected to a jet of cooling air from an additional nozzle or conduit 7 and is momentarily released by the chuck gripping jaws 77 onto a support 222 of a gauging mechanism so that the entire length of tubing may be accurately adjusted to correct position for subsequent cutting off or severing at position No. 8. At gauging position 5 the length of glass tubing is released onto a platform 222, the platform being positioned away from the glass releasing point while the glass tubing is moved into gauging position and the platform also being positioned away from the glass releasing point prior to the machine indexing or moving the adjusted length of glass tubing away from the gauging position. During the glass release interval while a head 29 is at rest in the gauging position the platform 222 is in alignment with and beneath a head 29 so that it may support a released length of glass tubing.

The gauging means or mechanism is illustrated in elevated position beneath a chuck in Fig. 8 and is illustrated in greater detail in Figs. 9 and 10. The platform 222 of the gauging means includes a support rod 223 having a top portion 224 rotatably supported on the rod 223 by a roller bearing 225. A disc of any suitable heat resistant and relatively soft material 226 carried by and preferably adhesively secured to the upper surface of the top member 224, is adapted to form a seat or rest for a length of tubing released by the chuck jaws 77 when they are opened. The support rod 223 of the platform 222 may be retained by a set screw on a supporting arm or bracket 229, the latter being secured by a set screw to a shaft or rod 231, having a forked end portion extending into a recess or groove of an adjusting nut 232 that is threaded onto an upwardly extending portion of an adjustment shaft 234. The adjustment nut 232 may be rotated along the threaded portion of the adjustment shaft 234 to vary the effective or operating height of the bracket arm 229 and of the platform 222 carried thereby; a lock nut may be utilized beneath the adjustment nut 232 for maintaining a set position.

Both the adjustment shaft 234 and the adjacent shaft 231 extend downwardly through suitable bushed openings of a bearing bracket 235 which may be bolted to the main platform or table 11. A spring 236 which rests against the underside of a portion of the bearing bracket 235 and against a collar member 237 carried by the operating shaft 231 serves to urge the shafts, bracket arm 229, and platform 222 downwardly toward operating cams 239 and 240 retained on the drive shaft 41 by suitable keys or set screws.

The lower end of each of the shafts 231 and 234 has secured thereto a roller bracket 242, 243 and these brackets rotatably support cam rollers 244 and 245. A guide plate 247 secured by bolts to the lower portion of the bearing bracket 235 prevents excessive accidental rotation of the adjustment shaft 234, which might otherwise serve to accidentally shift the position of the supporting platform 222.

The cam member 239 is effective to raise and lower the operating shaft 231 and adjustment shaft 234, together with the bracket arm 229 and platform 222 carried thereby, through the major portion of movement of the platform. The smaller cam 240 serves for making finer adjustments of the platform which supports the length of glass tubing; the smaller cam 240 may have a more exact profile than the larger operating cam 239; the formation of a more exact profile on the smaller cam 240 is more readily and economically manufactured than that of a larger cam. In the operation of the gauging mechanism the large cam 239 lowers the shafts 231 and 234 to a distance sufficient from the cam roller 245 to come into contact with and be affected by the profile of the smaller cam 240; the smaller cam 240 shifts the position of the platform 222 to provide the exact height adjustment of the platform 222 and of a length of glass tubing supported thereon.

During raising and lowering of the gauging mechanism, the turret 19 is at rest. Upon adjustment of the platform 222 and length of tubing carried thereby to correct height, the clutch operating rod 129 (Fig. 7) moves out of contact with the clutch operating lever 89 and the clutch jaws 77 move into contact with and again grip the length of glass tubing. Subsequent to gripping of the tubing by the jaws 77 the gauging mechanism is lowered away from the gripped length of tubing. At this time the index cam 43 is again in position to index or move the turret 19 in a step forward and the particular length of tubing and head moves to heating position 6 and from hence to heating position 7.

At heating position 6 and 7 the flared and height adjusted length of tubing is subjected to flame jets which heat the length of tubing adjacent the point at which the tubing is to be severed. Heating the glass causes it to approach a plastic or semi-molten condition for facilitating severing of a flanged length from the length of tubing, at cut off position 8.

When the index cam 43 has moved a head 29 to cut off position 8, a length of glass tubing carried by the chuck jaws of the particular head 29 will be disposed immediately above an internal cutter of a cutting mechanism illustrated more particularly in Figs. 17, 18 and 19 and a glass tube steadying device shown in Fig. 19a. In this position the internal cutter 251 is moved up through an apertured platform 337 into the hollow flare, by a cam and lever mechanism (Figs. 18, 19 and description thereof hereinafter), and thereafter the internal cutter and relatively larger external cutter 252 move toward each other to sever the glass tubing and form a flanged length which drops downwardly around the internal cutter; the steadying roller 250

(Figs. 19 and 19a) serves to support or steady the rotating length of glass tubing, at a location spaced from the cutters 251 and 252, during cutting to thus provide a truer or more accurate cut.

The internal cutter 251 is rotated in a direction opposite to the rotation chuck 29 and length of glass tubing held thereby. The outside or external knife or cutter 252 idles on ball bearings 254 and 255 and is driven by the glass tubing which comes into contact with the knife edge. In this manner the external knife is brought to correct speed of rotation.

The external or outside cutter or knife 252 is shown supported between upper and lower clamp plates 256 and 257 carried by a rotatable shaft 258, the latter shaft 258 being carried by a cylindrical bracket 259 threaded into a support bracket 260. A lock nut 261 serves to retain the two brackets in a desired adjustment obtained by rotating the upper bracket 259 along the threads of the lower bracket 260. A bearing shield 263 serves to minimize the possibility of pieces of glass or dirt reaching interiorly disposed ball bearings 254 and 255. The exterior or outside cutter is normally maintained at a set adjusted height and merely moves toward and away from a length of glass tubing in connection with severing thereof; only the internal cutter or knife 251 need be moved in vertical direction in connection with the severing of the glass tubing.

A glass tubing steadying device illustrated more particularly in Fig. 19a is preferably utilized in connection with the cutters as it provides for truer or more accurate cutting off of flares. The device illustrated comprises complementary bracket members 215 and 215' secured by bolts 218 or the like at a suitable elevation on the cylindrical bracket or upright 259 which carries the external cutter 252. The bracket-forming member 215' is provided with a horizontally extending slot in which is movably positioned a lower or horizontal leg of a substantially U-shaped adjusting member 220; a cover plate 221 extends over the lower horizontal leg of the U-shaped bracket 220 to retain it in its guide slot and is secured to the bracket-forming member 215' by screws 227. The upwardly extending leg of the U-shaped member 220 supports the opposite leg of the U-shaped bracket which has mounted thereon a lever 238, the lever being pivotally mounted on a screw or pin 241 and carrying the steadying roller 250 on a screw or pin 262 adjacent one end of the lever. The opposite end of the lever 238 is shown provided with a downwardly extending pin 248 which is normally urged against a stop screw 246 by a spring 249 connected between the free end of the lever 238 and the U-shaped member 220.

The edge or periphery of the steadying roller 250 may be positioned so that it is substantially in alignment with the edge of the external cutter 252 and rotation of the glass tube being cut serves to rotate the roller 250, as well as the external cutter 252. The supporting roller 250 positioned at a distance beneath the external cutter 252 provides an additional support point for the length of tubing during the severing or cutting off operation; it minimizes a tendency of the glass tubing to twist or incline itself during the cutting and thus contributes to the formation of a truer cutting line. The bracket-forming members 215 and 215' may be positioned at any suitable elevation on the cylindrical bracket or upright 259 so as to steady the length of glass tubing at any appropriate location.

Adjustment of the lateral position of the steadying roller 250 is provided by an adjusting screw 228 threaded through a lug or nut 230 carried by the cover plate 221 which is bolted to the bracket-forming member 215'. One end of the adjusting screw 228 is connected with an upwardly extending portion of the U-shaped bracket 220 so that, upon rotation of the adjusting nut 228, the U-shaped supporting bracket moves bodily along the mounting slot of the bracket-forming member 215'. A desired position of adjustment may be maintained by tightening the lock nut 233.

While the periphery of the roller 250 is shown in Figs. 19 and 19a in alignment with the edge of the external cutter 252 it will be clear that the lateral position of the supporting roller 250 may be readily adjusted to position the roller at other positions, for example, spaced slightly inwardly with respect to the cutting edge of the external cutter 252 or slightly outwardly with respect thereto. In addition to the adjustment provided by the adjustment screw 228, the angular position of the roller carrying lever 238 may be varied by rotation of the stop screw 246 in an appropriate direction.

The internal knife 251 is carried adjacent the upper end of a rod-like member 265 which extends downwardly and is supported by an adjustable chuck mechanism 267, the adjustable chuck mechanism 267 being in turn supported upon a drive spindle 268. The lower portion of the internal knife spindle 268 has mounted on a threaded portion thereof a lift collar 270, the lift collar 270 being adjustable along the length of the knife spindle 268 and being retainable in set or adjusted position by lock nuts and washers fitted over the threaded portion of the knife spindle 268. The lock nuts and lift collar may be adjusted along the length of the spindle 268 to vary the distance that the knife 251 is elevated and lowered in connection with cutting operations. In addition, adjustments of the vertical position of the internal knife 251 may be obtained by screwing the collar of the chuck mechanism 267 an appropriate distance along the threaded upper portion of the knife spindle 268.

The knife spindle 268 is shown extending through a drive sleeve 273 provided with a longitudinally extending slot 274 through which may travel a key 275 secured by pins or otherwise to the knife spindle 268. The lower end of the drive sleeve 273 has fixed thereto a drive pulley 276; as drive pulley 276 rotates it turns both the drive sleeve 273 and the knife spindle 268. The cooperating key 275 and slot 274 provide for vertical or longitudinal movement of the knife spindle 268 simultaneously with rotation thereof. A collar 277 secured to the upper end of the drive sleeve 273 serves to retain the drive sleeve in position and a thrust bearing 278 minimizes end thrusts. Suitable needle bearings or other bearings 279 may be provided adjacent the upper and lower portions of the drive sleeve 273 for facilitating rotation thereof with the drive pulley 276, the bearings 279 being carried by a pivotally mounted bearing bracket 280.

The pulley 276, drive sleeve 273 and cutter operating spindle 274 are shown rotated by a drive belt 282 which passes over idler pulleys 283 and fits about a driving pulley 284 carried by the drive shaft 60; in this way the driving motor 15 is effective to rotate the internal knife 251. As previously pointed out, speed of rotation of the knife 251 may be readily controlled by making suitable adjustments to the speed control mechanism 62 illustrated in Fig. 6.

Raising and lowering of the inside cutter spindle 268 is achieved through a lifting lever 286 (Figs. 18 and 20) having rollers 287 adjacent a forked end thereof which fit into a groove of the lift collar 270. Lifting lever 287 is provided with an extension 288 upon which is mounted a cam roller 289 which travels against and is maintained in contact with a cutter lifting cam 291 by a tension spring 292. The cutter-lifting cam 291 is keyed to the same drive shaft 41 as that upon which is mounted the index cam 43.

The opposite end of the lifting lever 286 extends about an eccentric or offset portion 294 of an eccentric pin 295 which extends through a bracket 297 secured by bolts to the underside of the main platform or table 11. The outer end of the eccentric pin 295 has secured thereto an adjustment hand wheel 298. Rotation of the hand wheel 298, when the lock nut 299 is loosened, is effective to rotate the eccentric pin so that a different portion thereof is effective upon the lift lever 286. In this manner the very fine adjustment may be obtained of the distance through which the cutter spindle 268 is lifted. While the eccentric adjustment at the left end of the lift lever 286 is a very fine adjustment, the effect of any adjustment by rotaton of the hand wheel 298 is multiplied due to the relatively greater length of the lift arm at the right of the cam roller 289.

The construction provides three different ways of adjusting the cutting height of the cutter 251. Height adjustments of the cutter may be obtained by shifting the position of the chuck 267, by shifting the position of the lift collar 270, and by turning the eccentric pin 295 through hand wheel 298. The last mentioned adjustment means provides a convenient manner of making fine adjustments.

As previously pointed out, the cutters move toward each other to sever a length of glass tubing and move apart from each other upon completion of the severance. In order to achieve this movement the internal cutter is carried by a cutter bearing bracket 302, the respective bearing brackets being rotatably mounted upon upwardly extending cutter bracket shafts 303 and 304. The cutter bracket shafts are carried by a shaft supporting bracket 305 bolted to the upper surface of the table or platform 11. Adjustment screws 307 and 308 extend through suitable extensions of the support bracket 305 and may be adjusted to control the distances that the cutter bearing brackets and cutters carried thereby may move together; the adjustment screws 307 and 308 bear against rearward extensions of the cutter bearing brackets.

The cutter bearing brackets are normally pulled toward each other by a spring 310 which has its ends extending around posts 311 and 312 of the respective cutter bearing brackets 301 and 302. The spring 310 tends to pull the brackets together about pivot pins 303 and 304.

Movement apart of the bearing brackets 301 and 302, together with the cutters carried thereby, is achieved at the correct instant by a cam 313 keyed to the drive shaft 41 through the intermediation of cam roller 314, lever 315 pivotally mounted intermediate the ends thereof on a support bracket 317, plunger yoke 318, pin 319, and plungers 320 and 321. The plungers are secured to the plunger yoke and move to and fro through appropriate openings in a plunger bracket 325. The inner ends of the plungers 320 and 321 are inclined or beveled and the beveled end support rollers 326 and 327 carried by the cutter bearing brackets 301 and 302. Adjustment of the rollers 326 and 327 toward and away from the plungers 320 and 321 may be obtained by shifting the positioning of cutter adjusting screws 328 and 329.

During movement of the turret 19 and heads 29 carried thereby, the operating cam 313 is effective to maintain the plungers 320 and 321 in inward position, in which relationship the cutters 251 and 251 are maintained spaced apart. When the turret comes to rest the cam 313 permits the motion spring 330, which extends about a plunger 331, to urge the upper end of operating lever 315 outwardly or away from the cutter bearing brackets 301 and 302. This is effective to move the inclined surface of the plungers 320 and 321 away from the rollers 326 and 327, allowing the tension spring 310 to pull the cutter bearing brackets and cutters 251 and 252 toward each other. Severing of a length of glass tubing then occurs. The severed lengths will, at this point in the operations, have a shape generally similar to that illustrated in Figs. 2a, 2b, wherein the lower edge projects outwardly and the upwardly extending portion is substantially cylindrical. The various described cutting adjustments of the two cutting knives provide for obtaining an edge which is cut straight through the glass wall, or an edge which is cut off at an outwardly inclined angle, or an edge which is cut off at an inwardly inclined angle. Any one of these forms of cut off ends may be desirable at one time or another.

Preferably the supporting portions of the cutters 251 and 252 project upwardly through an elongate opening of a cutter motion guard 271.

It will be noted that the cut off position 8 also shows a flame jet tube 5a. This flame jet tube 5a is effective to continue the heating of the glass concurrent with severing of the glass by the cutters 251 and 252.

A length of tubing or flare thus produced as a result of the severing operation drops downwardly around the internal cutter rod 265 between spaced jaws 334 and 335 (Figs. 23 and 23a), onto a platform 337 (Fig. 22). The cutter is then moved down below the platform, by cam 291 and lever 286 (Fig. 18) and gripping jaws 334 and 335 clamp the flared length. Upon closing of the gripping jaws 334 and 335 against the intermediate severed length of glass tubing to rigidly hold the flare, the jaws are moved about an orbit or path to quickly present the firmly held glass article to various closely adjacent heating and forming steps and operations for forming an article of the general shape illustrated in Fig. 2.

As illustrated in Figs. 22 and 23, the portion of the machine which is adapted to form the upper end of the article into a shape such as illustrated in Fig. 2, is supported on a standard 338 which rests at its lower end upon the floor. The machine may be adjusted vertically by varying the position of an adjusting nut 331 threaded onto the supporting standard 338. The supporting base 340 rests against the adjusting nut 331 and has bolted thereto a casing 341 which contains an index cam 342 and operating cam 344, both keyed to an operating or drive shaft 345. An upwardly extending hollow member 347, secured by bolts or otherwise to the casing 341, carries bracket arms 348 and 349 to the outer portions of which are secured means for supporting the platforms or tables 337 and 350. The platform 337, as previously pointed out, is adapted to momentarily support a severed length of glass tubing; the platform 350 is adapted to assist in supporting the severed length of tubing during shaping of the upper end thereof to elongate form.

A plurality of sets of the clamping jaws 334 and 335 are carried by a table 349 which is keyed to and movable with a rotatable upwardly extending hollow shaft 351 that extends through suitable bearings 352 carried by the upwardly extending hollow member 347.

Rotation of the hollow shaft 351 is achieved by the index cam 342 mounted on the drive shaft 345, the drive shaft 345 being in turn connected by a suitable coupling means 354 (Fig. 23) with the same main drive shaft 41 previously described. As the index cam 342 is rotated by the drive shaft 345, it serves to rotate or advance the shaft 351 in step by step manner through the intermediation of a roller disc 355 and rollers 356 carried thereby.

While any suitable number of rollers 356 may be carried by the roller disc 355 and any suitable number of clamping jaws 334 and 335 may be utilized, twelve sets of jaws and twelve advancing rollers have proven satisfactory in operation; thus the shaft 351 may serve to rotate the sets of clamping jaws through twelve separate steps in making a single complete revolution. The driving speed and operation of the jaws is achieved from the same electric driving motor 14 which serves to advance the turret 19 and chuck heads 29 carried thereby; the two portions of the machine are accurately coordinated so that a set of clamping jaws 334 and 335 serves to grasp a severed length of tubing and move it away from the previously described portion of the machine.

Each set of clamping jaws 334 and 335 is effective to present a gripped glass article to a series of heating burners which are adapted to direct flames against the glass article to render it appropriately plastic for being acted upon at a forming or shaping station. The shaping or forming station is at the left side of Figs. 22 and 23. Any suitable number of heating steps may be utilized; it has been found that in actual operations excellent results are obtained by subjecting the glass article to heating operations from shortly subsequent to the time that it is grasped by the jaws 334 and 335 after being severed until it reaches the shaping station at the left side of Fig. 22.

As shown in Figs. 23 and 23a the clamping jaws 334 and 335 are operated substantially simultaneously by a cam 357 bolted to a supporting bracket 358 and bracket clamp 359. The cam 357 is stationary with respect to the moving sets of clamping jaws and is contacted by rollers 361 mounted adjacent the outer ends of arms 362. The arms 362 are mounted adjacent their inner ends on shafts 364 rotatably journaled into the cam table 346. A jaw operating member 365 keyed to the shaft 364 has recessed end portions extending around operating pins 366 and 367 extending outwardly from the inner ends of the clamping jaws 334 and 335. As the jaw operating arm 362 is moved about the axis of shaft 364, the operating member 365 moves correspondingly and serves to open or close the clamping jaws 334, 335 with respect to each other, depending upon the direction of motion of the cam operating arm 362. The jaws 334 and 335 are normally urged toward each other by a spring 368, connected with a pin 369 and at its opposite end with a pin 370 extending outwardly from a collar secured to the cam operating shaft 364. The spring 368 also serves to maintain the arm 362 and roller 361 in an inward position so that the cam roller 361 is in position to meet and follow the curve of operating cam 357. Each set of operating cams is adapted to grasp an article adjacent the severing or cutting off position (position No. 8 of Fig. 3), and to carry it around through the various heating and forming steps to a release position, release of the article being also effected by the operating cam 357.

Any suitable types of heating burners may be utilized for heating the length of glass tubing prior to its presentation to the forming mechanism or devices shown at the left side of Fig. 22. Oxygen, air, and gas, in suitable mixtures, may be conveyed to the various burners through the respective conduits 371, 372 and 373 carried by a bracket 374 bolted to a portion of the mechanism casing 341.

The devices illustrated at the left side of Fig. 22 and in Fig. 24 are adapted to spread or stretch an upper cylindrical neck portion of a severed length of glass tubing into an elongate shape similar to that illustrated in Fig. 2. When a preheated severed article is moved into position immediately over the supporting table 350 the rotating cam 344 is effective to move the bell crank 375 about a pivot 376 to move the inner end of the bell crank in vertical direction. The engaging end of the bell crank 375 is maintained in contact with the operating cam 344 by a spring member 377. Upward movement of the inner end of the bell crank 375 serves to lift a vertical shaft 378 which extends upwardly through the supporting sleeve 363, carried by the housing bracket 340. Vertical movement of the operating shaft 378 serves to rotate the lever 380 about the pin 381 to thus raise and lower a forming means operatively connected with the outer end of the lever 380. Adjustment of the distance through which the operating lever 380 moves may be achieved through the adjustment means 382 intermediate the operating shaft 378 and lever 380.

Movement of the operating lever 380 about the pin 381 serves to raise and lower spreader or stretching fingers 384 and 385, through the intermediation of slide block 387, yoke 388, sleeve 389, shaft 391, finger brackets 392 and 393 and bracket-supporting collars 395 secured on the lower portion of a hollow sleeve 397 carried by a bracket arm 398. The upper surface of the collar members 395 provides a support for outwardly extending portions 400 and 401 of the finger-supporting brackets 392 and 393; as the shaft 391 is moved downwardly by the operating lever 380, the finger-supporting brackets are rotated about a pivot shaft 402 to thus move outwardly the lower end portions of the brackets and to spread apart the fingers 384 and 385 bolted thereto. The arrangement of the parts is such that the fingers 384 and 385 move into the upper end of a severed length of glass tubing and move apart with respect to each other to spread apart from each other oppositely disposed wall portions of the length of glass tubing.

As oppositely disposed portions of the glass article move apart from each other, intermediate portions of plastic or semi-plastic glass are pulled or moved inwardly toward each other;

the effect is to form the upper end of the length of severed glass tube into elongate shape. The engagement of the outer surface of the spreader fingers 384 and 385 with the oppositely disposed inner walls of the severed length of tubing gives an elongate opening of accurate lengthwise dimensions.

When the operating lever 380 serves to move the shaft 391 upwardly, the finger-supporting brackets 392 and 393 have the lower ends and spreader fingers carried thereby moved toward each other. A spring 404 minimizes the possibility of injury to operating parts by providing a yielding cushion intermediate the shaft 391 and hollow member 389. Adjustment screws and lock nuts 405 secured to oppositely disposed portions of the frame or other stationary part may be so set as to contact the upper sides of the projections 400 and 401 of the finger brackets to thereby insure closing of the brackets and spreader fingers toward each other.

Upon removal of the spreader fingers from the severed length of tubing the sets of gripping jaws 334 and 335 are advanced in step by step relationship to move the resulting shaped article to a released position. Release of the article may be by the cam 357 which moves the cam operating arm 362 to separate the gripping jaws with respect to each other. Any suitable guide chute (not shown) may be utilized to catch the released article and guide it to a receptacle.

In some instances it may be desirable to form an elongate shape at the upper end of a severed length of glass tubing by utilizing a squeezing operation in lieu of spreading opposite sides by the spreader fingers and mechanism illustrated at the left side of Fig. 22 and in Fig. 24. In such event the device or mechanism illustrated in Figs. 25 and 26 may be employed. When the operating shaft 378a of this mechanism moves in upward direction it serves to move the operating lever 380a about the pin 381a and to move a guide shaft 408 and guide block 409 downwardly. The guide block has bolted to the lower portion thereof a gauging member 410 which moves into the interior of the severed length of tubing. As the operating lever 380a moves about pivot pin 381a the spaced arms 413 secured to the opposite ends of the pin 381a are correspondingly moved. When the arms 413 are moved downwardly they serve to move toward each other the jaws or lower ends of bell crank members 414 and 415. The lower ends of these bell crank members are provided with appropriately shaped linings 416 (Fig. 26a) adapted to press against exteriorly disposed surfaces of the severed length of glass tubing. The jaws squeeze the opposite sides of the tubing toward each other and move the inner surface of the severed length of tubing into contact with the intermediately disposed gauging member 410.

Movement together and apart of the jaws or lower ends of the bell cranks is performed by the spaced arms 413 through the intermediation of adjusting bolts 418, tubular members 419, shafts 420, collar members 422 and bell crank pivots 423. Spring members 421 extending about the shafts 420 intermediate a stationary collar 425 and collars 426, serve to urge the shafts 420 in upward direction at all times and to assist in returning them to an upward position in readiness for a subsequent downward movement. Springs 427 at the interior of the tubular members 419 tend to maintain the latter members and the operating rods 420 in extended relationship and provide for relative movement of these parts with respect to each other, in the event of any jamming, to thus minimize the possibility of damage to operating parts.

Only one side of the operating mechanism is shown in Fig. 26, the opposite side thereof being the same and hence a description of the mechanism at one side of the device applies to both.

The mechanism described in connection with Figs. 25 and 26 is effective to form the upper end of a severed length of glass tubing into a shape such as is shown in Fig. 2 of the drawings; the mechanism described in connection with Figs. 25 and 26 gives a more accurate width to an elongate opening. In some instances an accurate width is desired and in other instances an accurate length is more desirable.

A further form of device or mechanism adapted to form an elongate open end on a severed length of glass tubing is illustrated in Figs. 27 and 28 of the drawings. The device illustrated in these drawings includes a gauging member 428 insertable into the interior of a length of tubing and clamping jaws 429 and 430 adapted to be moved inwardly toward the gauging member 428. Operation of the gauging member 428 and the clamping jaws 429 and 430 may be achieved by the vertically movable operating shaft 378b through the intermediation of adjustment mechanism 382b, link 432, lever 433 carried on an adjustable bracket 434, link 435, plate 437, gauge rod 438 and jaw operating rods 439 and 440.

As the operating shaft 378b is moved upwardly to thus effect downward movement of the far end of the operating lever 433, the gauge rod 438 moves downwardly and correspondingly moves the sleeve-like member 441. The latter member has the gauge member 428 bolted to the lower end thereof and the latter is inserted into the upwardly disposed open end of an adjacent length of glass tubing. A spring 442 located at the interior of the cylindrical-like member 441 and intermediate this member and the gauge operating shaft 438 minimizes the possibility of damage to the operating parts. The gauging member 428 may have any suitable shape, as shown it has a shape adapted to engage with and urge outwardly toward elongate form, the oppositely disposed wall portions of the length of glass tubing.

As the plate member 437 is moved downwardly with the operating rod 438 it presses against springs 444 and 445 shown extending about the jaw operating shafts 439 and 440 and causes the jaw brackets 429 and 430 to move toward each other in such manner as to press the opposite outer walls of a severed length of glass tubing toward each other and against the outer sides of the interiorly positioned gauging member 428. The extent of inward movement of the brackets 429 and 430 and of the jaws carried thereby may be controlled or adjusted by suitably positioning the adjustment screws 447 and 448. The brackets 429 and 430 pivot about the shaft 449 carried adjacent the lower part of the gauge operating shaft 441. Upon upward movement of the link member 435, under the influence of the operating lever 433 and shaft 378b, the jaw operating rods 439 are effective to move the brackets and jaws 429 and 430 apart from each other and the interiorly disposed gauging member 428 moves upwardly from within the interior of the formed length of glass tubing.

The mechanism shown and described in connection with Figs. 27 and 28 tends to provide a glass flare having an elongate opening at one end thereof of both accurate length and width.

A gauging member 428a having a shape similar to that shown in Fig. 28a may be utilized in lieu of the shape illustrated in Figs. 27 and 28. The gauging member 428a illustrated in Fig. 28a serves primarily as an intermediately positioned member against which the squeezing jaws may press the side walls of the severed length of tubing.

The devices utilized for spreading or stretching tubing walls to provide an elongate opening and the devices for squeezing or pressing tubing walls together may be utilized together or in combination so that each acts upon the same glass flare. Stretching of the article may be first performed and thereafter pressing; or pressing may be done first and thereafter the stretching step. Either order of sequence may be used and there is produced an article having an elongate opening of accurate length and accurate width.

In some instances articles having the shape illustrated in Fig. 2 are desired for utilization in the manufacture of certain types of space discharge tubes and the like. In other instances articles such as are shown in Figs. 2a and 2b are desired. Where articles such as in Fig. 2 are desired, the machine is utilized as hereinabove described in detail. Where articles such as illustrated in Figs. 2a and 2b are desired the mechanism for forming the elongate opening may be eliminated and the articles discharged from the machine immediately subsequent to their severance from the lower end of a glass tube at position 8 of Fig. 3.

Where it is desired to utilize an article having a shape such as illustrated in Fig. 2a or 2b, upon downward movement or retraction of the internal cutter rod 265 and cutter 251, there is preferably provided a cam 290 keyed to the drive shaft 41 which is effective to operate a lever 293 to open for a short period of time a valve for supplying air to an air jet tube or conduit 332 Fig. 29. The momentary blast or jet of air from the conduit 332 directs severed flares toward a downwardly inclined chute 253 through which the internal cutter shaft is reciprocable, and thence into a collecting receptacle. The air jet 332 is located lower down than the flame jet tube 5a (Fig. 3) and hence does not interfere with its heating effect.

A résumé of the operation of the machine is as follows: Glass tubes of suitable length are supported in a basket above the rotatable turret, some of the tubes having their lower ends positioned within the chimney-like openings 160 through which heat raising from the burners on the table may pass. Thus the tubes are preheated. As a length of glass tube is used up in the making of flared articles, it gradually moves down through the chucks or holding means carried at spaced intervals about the turret. When a length of tubing has moved down sufficiently far in the chucks, a fresh preheated piece may be moved out of a chimney-like opening and aligned with a chuck. The chuck jaws may be opened by an operator lifting upwardly on the outer end of the chuck release lever 89, the glass may then be inserted and thereafter clamped by the operator releasing lever 89. Lengths of glass tubing carried by the chucks pass successively through the various positions of the machine. At positions 1, 2, 4, 6 and 7 (Fig. 3) the lower portion of the downwardly extending length of tubing is heated or cooled, as appropriate. At position 3, the flaring means illustrated in detail in Figs. 9, 11 and 12 is raised into position and operated from the drive shaft 41 to form a flange at the lower end of the tube. At position 5, the reciprocating rod member 129, shown at the right side of Fig. 9, raises up into contact with the outer end of the chuck operating lever 89 and lifts it; this releases the chuck jaws and the tubing is released on to the adjacent platform 222, over which the lower end of the tube is then positioned. The chuck operating rod 129 and the platform 222 are both raised and lowered by cams secured to the operating shaft 41. The purpose of the mechanism of position 5 is to position the glass in a correct vertical position for cutting off at the subsequent position 8. At position 8 the internal cutter is raised up into the inside of the tube, by the shaft 41 and suitable cams and levers, and both the inner cutter and the outer cutter 252 move toward each other so as to cut through the cylindrical wall of the tube. The cut off open ended flanged lengths drops down around the internal cutter, which is then drawn down through the length of tube so that the jaws 334 and 335 (Fig. 23) may grip the cut off length and move it around through a number of heating positions to the position shown at the left of Fig. 22, where the upwardly disposed cylindrical end of the tube length is formed into an elongated opening. This elongated opening may be formed to a very accurate width, or a very accurate length, or to both accurate length and width by the device illustrated more particularly in Figs. 24–28. After being thus formed, the jaws 334—335 may be opened by a cam 357, to release the formed articles. The speed of indexing of the turret and of the length gripping jaws 334—335 may be varied from the selective speed adjuster and connections of it to the outer hollow shaft which turns the turret, and to the shaft 41 which carries the cams that raise and lower the various devices. The speed of rotation of the chucks, internal cutter and flaring tool may be varied from an additional drive motor and entirely separate selectively settable speed controller; thus the latter two driven portions may be operated and adjusted entirely independently of each other to give extreme flexibility of operation.

It will be seen that the present invention provides a machine well adapted to the manufacture of flared glass articles of the types described at a rapid rate. Any suitable number of heads or chucks may be utilized. Lengths of glass tubing inserted into the machine are automatically acted upon and formed into complete flared articles.

One driving motor turns the spindles and chucks which hold lengths of glass tubing, so that the chucks and tubing held thereby may be rotated at any desired speed, independent of movement of the turret. The second driving motor effects operation of turret indexing or movement and also cam rotation. The speed of either motor may be readily and independently changed by selectively setting variable speed control means provided intermediate the particular motor and the parts which it is adapted to actuate. Either motor may be completely shut down without affecting the operation of the other motor; the construction provides a highly desirable and valuable flexibility of operation.

While any suitable speeds of operation may be utilized for the machine it has been found practicable to so operate it as to produce flared articles at the rate of about 2400 to 2600 per hour.

Utilization of independent driving motors and independently variable speed controls provides a machine which may be operated at relatively rapid speeds. Since the speed of operation is relatively high it is desirable that means have been provided for preheating lengths of glass tubing prior to insertion thereof into the operating parts of the machine. Heat rising from the heating burners, located at suitable positions around the path through which lengths of tubing are moved, is directed by chimney-like means toward, into and along lengths of glass tubing which have their lower ends in alignment with the chimney-like means.

The flaring mechanism is preferably of a pin type which swings outwardly in such manner as to closely simulate manual or hand flaring techniques, the tool rotating during elevation and as it moves outwardly along an arc.

Lubrication and cooling of the rapidly rotating chucks and spindles is provided by new and improved pumping means which conveys oil or other liquid from a reservoir upwardly to the supporting bearings of the rotating chucks or heads. The cooling and lubricating liquid returns by gravity to the pumping means. The lubricating and cooling liquid circulates continually during operation of the heads.

The inside knife, which in some instances may be a pin-like member, is positively driven and both the inner and outer knives move toward each other to sever an intermediately disposed thickness of glass tubing. The outer knife is driven by the glass so that it assumes an optimum speed. Movement of the knives is readily adjustable; the knives may be readily adjusted to operate at various heights. The inner knife or cutter is provided with three different height adjusting means; the hand wheel and eccentric means facilitates making of adjustments at all times, even during such times as the machine is in operation.

As brought out in connection with Fig. 21, a gauging device adapted to be moved into the path of a freshly inserted length of glass tubing positions the lower end of the length at the tubing severing level, which is slightly higher than is normally determined by the gauging mechanism of position No. 5. This minimizes waste of a lower end of an inserted length of glass tubing.

The formation of an elongate opening at one end of a flared article is provided by means which forms elongate openings of either or both accurate lengthwise or transverse dimension. The present means for grasping a cut off or severed flare and presenting it to the elongate opening forming parts of the machine is achieved by a relatively simple and highly reliable construction which provides for increased production speeds and the elimination of highly objectionable interim cooling periods. During flare movement and forming operations, the flare is rigidly grasped by the gripping jaws.

The various features cooperate to provide a new and improved machine which may be operated at relatively high speeds to produce flared articles at high rates. The machine is rugged in construction and adapted to long life under substantially continuous operation at its high speeds, with minimum amount of vibration and high degree of smoothness and quietness of operation.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention I claim:

1. In a machine of the class described, the combination of a movable turret having a plurality of open-ended chimney-like means extending therethrough, heating means for said chimney-like means, a plurality of tubing-holding means carried by said turret adjacent said chimney-like means, and tubing-guiding means spaced above said tubing-holding means, whereby a length of tubing is adapted to have its lower end initially positioned in registry with an open end of a chimney-like means for preheating of the tubing and subsequently positioned in registry with a tubing-holding means for subjection to forming operations.

2. A machine of the class described including the combination of a movable turret having a plurality of open-ended substantially tubular means extending therethrough, means for supplying heat to said tubular means, a plurality of spaced tubing-holding means carried by said turret adjacent said tubular means, seating means in each of said tubular means, and tubing-guiding means spaced above said tubing-holding means and having an opening substantially in alignment therewith, whereby a length of tubing is adapted to have its lower end initially positioned on a seating means of a tubular means for preheating of the tubing and subsequently positioned in engagement with a tubing-holding means for subjection to forming operations.

3. In a machine of the class described having a rotatable turret connected with a depending shaft and carrying rotatable tube holders and having tube flanging and severing means, means including a cam and drive shaft operatively connected with said depending shaft for indexing said shaft and the turret, a drive motor and selectively settable speed control means operatively connected with said drive shaft for rotating it, a second depending shaft operatively connecting with said tube holders for rotating them and with the tube flanging and severing means, means including gearing and an additional drive shaft connected with said second depending shaft, and an additional drive motor and selectively settable speed control means operatively connected with said additional drive shaft for rotation thereof and rotation of the tube flanging and severing means independently of said first mentioned depending shaft.

4. In a machine of the class described having a rotatable turret connected with a depending shaft and carrying rotatable tube holders and having tube severing means, a member secured to said depending shaft having a plurality of cam rollers projecting therefrom at spaced intervals, a cam adjacent said cam rollers having a groove about its exterior for receiving said rollers and indexing said depending shaft and turret, means including a drive shaft operatively connected with said cam for rotation thereof, a drive motor and selectively settable speed control means operatively connected with said drive shaft for rotating it, a second depending shaft operatively connected with said tube holders and with the tube severing means for rotating them, means including gearing and an additional drive shaft connected with said second depending shaft, and an additional drive motor and selectively settable speed control means operatively connected with said additional drive shaft for rotation thereof and of the tube holders and severing means independently of said first mentioned depending shaft.

5. A machine as claimed in claim 3 in which there is provided means operable in timed relationship with rotation of said turret for successively actuating said tube holders to release their hold on tubes, second means for supporting tubes when released, additional means for raising and lowering said second means, and a threaded shaft and collar operatively connected with said second means for selectively varying the elevation thereof upon movement of the collar along the shaft.

6. A machine as claimed in claim 4 in which there is provided eccentric means for selectively varying the elevation of said severing means while said additional drive motor is operating.

7. A machine as claimed in claim 3 in which there is provided means for elevating and lowering said flanging and severing means, and said elevating and lowering means is operatively connected with said first mentioned drive shaft and is independent of any driving connection with said additional drive shaft.

8. In a machine of the class described, the combination of means rotatable about a vertical axis having jaws for retaining and rotating a length of glass tubing while being heated, a sleeve extending about a portion of said rotatable means and stationarily mounted with respect thereto, a screw member carried by said rotatable means and facing toward a wall of said sleeve adapted to move fluid upwardly along said sleeve wall, and a fluid reservoir carried by and rotatable simultaneously with said rotatable means having a wall portion exposed to the atmosphere and spaced from and extending upwardly along a portion of said sleeve.

9. In a machine of the class described, the combination of means rotatable about an upright axis having gripping means for retaining and rotating a length of glass tubing while being heated, a sleeve extending about a portion of said rotatable means and stationarily mounted with respect thereto, a screw member carried by said rotatable means and facing toward a wall of said sleeve adapted to move fluid upwardly along said sleeve wall, and a fluid reservoir carried by and rotatable with said rotatable means having a lower wall portion spaced below an exposed lower end of said sleeve and an exposed outer wall portion spaced from and extending upwardly along an exterior surface portion of said sleeve.

10. In a machine of the class described having hollow means provided with gripping means rotatable about a generally upright axis for retaining and rotating a length of glass tubing while being heated, a sleeve extending about a portion of said rotatable means and stationarily mounted with respect thereto, a screw member carried by said rotatable means having a generally spiral groove facing toward a wall of said sleeve adapted to move fluid upwardly along said sleeve wall, and a fluid reservoir carried by and rotatable with said rotatable means having a generally upright wall portion spaced from and extending upwardly along an outer portion of said sleeve, said wall portion of the reservoir being exposed to the atmosphere whereby air may circulate freely thereover to cool the wall during rotation thereof.

11. In a machine of the class described having a movable turret having an opening therethrough and means for supplying heat to said opening, means for supporting a length of tubing with its lower end in registry with said opening, tubing-holding means carried by said turret adjacent said opening and tubing-guiding means spaced above said tubing-holding means and carried by and movable with said turret, whereby a length of tubing extending through said tubing guiding means is adapted to have its lower end initially positioned in registry with said opening for preheating of the tubing and subsequently positioned in registry with the tubing-holding means for subjection to forming operations.

12. In a machine of the class described, the combination of a platform for supporting one end of a length of tubing, means reciprocable toward and away from said platform having a spreader portion insertable into and withdrawable from an opposite open end of said tubing for forcing apart from each other oppositely disposed wall portions of said tubing to form an elongated opening, a jaw at each opposite side of said spreader portion movable toward and away therefrom for pressing toward each other and against said spreader portion tubing wall portions disposed intermediate said forced apart wall portions, and additional means reciprocable toward and away from said platform for moving said jaws toward the spreader portion during movement of said additional means toward the platform and for moving them away from the spreader portion during movement of said additional means away from the platform.

13. In a machine of the class described, the combination of a platform for supporting one end of a length of tubing, means reciprocable toward and away from said platform having a spreader portion insertable into and withdrawable from an opposite open end of said tubing for forcing apart from each other oppositely disposed wall portions of said tubing to form an elongated opening, a pair of jaws carried by said reciprocable means movable toward and away from said spreader portion for pressing toward each other and against said spreader portion tubing wall portions disposed intermediate said forced apart wall portions, and means for moving said jaws toward the spreader portion during movement of said reciprocable means toward the platform and for moving them away from the spreader portion during movement of said reciprocable means away from the platform.

14. A device as claimed in claim 12, in which said jaws comprise portions of a pair of rotatably mounted bell crank members.

15. In a machine of the class described, the combination of a platform for supporting one end of a length of tubing, a pair of oscillatably mounted members having jaws movable toward and away from each other for pressing toward each other tubing wall portions, means reciprocable toward and away from said platform for actuating said oscillatably mounted members, and means connected with said reciprocable actuating means and with said members for oscillating said members and moving the jaws toward each other during movement of said reciprocable means toward the platform and for oscillating the members and moving the jaws away from each other during movement of said reciprocable means away from the platform.

16. In a machine of the class described, the combination of a platform for supporting one end of a length of tubing, spreader means comprising a pair of oscillatable members insertable into and withdrawable from an opposite open end of said tubing for forcing apart from each other oppositely disposed wall portions of said tubing to form an elongated opening, means reciprocable toward and away from said platform and connected with said spreader means for moving the spreader means toward and away from said platform, and means for moving said members apart from each other during movement of the reciprocable means toward said platform and for moving them toward each other during movement of the reciprocable means away from the platform.

17. A machine of the class described for forming hollow articles, including the combination of heating means for applying heat to portions of a glass tube, means for turning an end of said tube laterally to form a flange, a plurality of sets of spaced movable jaws for enclosing a major portion of the periphery of a portion of said tube, means for cutting through the wall of said tube to form a flanged length thereof with open opposite ends, additional heating means, spreader means, means for moving the jaws into gripping engagement with said length and transferring it to a position adjacent said additional heating means for applying heat to said gripped length of tube adjacent the open end opposite said flange and into registry with said spreader means, said spreader means being insertable into the open end opposite the flange, means for forcing surface portions of said spreader means radially of said tube wall for forming said open end into an opening of elongate cross sectional shape, and means for thereafter withdrawing said spreader means from said elongate opening.

18. A machine of the class described for forming hollow articles, including the combination of heating means for applying heat to portions of a glass tube, means for turning an end of said tube laterally to form a flange, a plurality of movable jaws for enclosing a major portion of the periphery of a portion of said tube, means for cutting through the wall of said tube to form a flanged length with open opposite ends, additional heating means, clamping means, a supporting platform, means for moving the jaws into gripping engagement with said length and transferring it to a position adjacent said additional heating means for applying heat to said gripped length of tube adjacent the open end opposite said flange and transferring it into registry with said clamping means and said supporting platform, means movable toward said platform and insertable into the open end opposite the flange, means for actuating the clamping means to pass against said inserted member oppositely disposed wall portions of said tube length adjacent said open end to form an elongated opening and to thereafter release the clamping means, and means for thereafter withdrawing said inserted means from said elongated opening.

19. A machine of the class described for forming hollow articles, including the combination of heating means for applying heat to portions of a glass tube, means for turning an end of said tube laterally to form a flange, a plurality of sets of spaced movable jaws for enclosing a major portion of the periphery of a portion of said tube, means for cutting through the wall of said tube to form a flanged length thereof with open opposite ends, additional heating means, spreader means, means for moving the jaws into gripping engagement with said length and transferring it to a position adjacent said additional heating means for applying heat to said gripped length of tube adjacent the open end opposite said flange and into registry with said spreader means, said spreader means being insertable into the open end opposite the flange, means for operating said spreader means for forming said open end into an opening of elongate cross sectional shape, and means for thereafter withdrawing said spreader means from said elongate opening.

LOUIS C. KAHLE.

REFERENCES CITED

The following references are of record in the file of this patent:

UNITED STATES PATENTS

| Number | Name | Date |
|---|---|---|
| 1,546,353 | Rippl et al. | July 14, 1925 |
| 1,569,652 | Halversen | Jan. 12, 1926 |
| 1,635,316 | Eisler | July 12, 1927 |
| 1,643,215 | Koenig | Sept. 20, 1927 |
| 1,861,271 | Herre | May 31, 1932 |
| 1,886,395 | Graul | Nov. 8, 1932 |
| 1,920,326 | Schuck et al. | Aug. 1, 1933 |
| 2,001,436 | Schutz | May 14, 1935 |
| 2,077,827 | Dichter | Apr. 20, 1937 |
| 2,084,811 | Keen | June 22, 1937 |
| 2,101,213 | Dichter | Dec. 7, 1937 |
| 2,256,754 | Schmitter | Sept. 23, 1941 |
| 2,266,417 | Eisler | Dec. 16, 1941 |
| 2,334,784 | Miller | Nov. 23, 1943 |
| 2,447,568 | Eisler | Aug. 24, 1948 |